US009693306B2

(12) United States Patent
Young et al.

(10) Patent No.: US 9,693,306 B2
(45) Date of Patent: Jun. 27, 2017

(54) MECHANISMS TO SUPPORT UE POWER PREFERENCE SIGNALING

(71) Applicant: BlackBerry Limited, Waterloo (CA)

(72) Inventors: Gordon Peter Young, Shipston-on-Stour (GB); Nicholas William Anderson, Bristol (GB); Eswar Vutukuri, Havant (GB)

(73) Assignee: BlackBerry Limited, Waterloo, Ontario (CA)

( * ) Notice: Subject to any disclaimer, the term of this patent is extended or adjusted under 35 U.S.C. 154(b) by 232 days.

(21) Appl. No.: 13/801,669

(22) Filed: Mar. 13, 2013

(65) Prior Publication Data

US 2014/0018085 A1 Jan. 16, 2014

Related U.S. Application Data

(60) Provisional application No. 61/670,510, filed on Jul. 11, 2012.

(51) Int. Cl.
*H04W 52/02* (2009.01)
*H04W 76/04* (2009.01)

(52) U.S. Cl.
CPC ... *H04W 52/0235* (2013.01); *H04W 52/0216* (2013.01); *H04W 76/048* (2013.01)

(58) Field of Classification Search
USPC ...... 455/522, 426, 452.2; 370/311, 318, 252
See application file for complete search history.

(56) References Cited

U.S. PATENT DOCUMENTS 6,961,570 B2 11/2005 Kuo et al.
7,155,261 B2 12/2006 Chen
(Continued)

FOREIGN PATENT DOCUMENTS

EP 1596616 A1 11/2005
EP 1981224 A1 10/2008
(Continued)

OTHER PUBLICATIONS

Young, Gordon Peter, et al.; U.S. Appl. No. 13/801,669, filed Mar. 13, 2013; Title: Mechanisms to Support UE Power Preference Signaling.
(Continued)

*Primary Examiner* — Khai M Nguyen
*Assistant Examiner* — Dung Lam
(74) *Attorney, Agent, or Firm* — Conley Rose, P.C.; J. Robert Brown, Jr.; Albert A. Abbou

(57) ABSTRACT

Disclosed herein is a method at a User Equipment (UE) comprising determining that a current radio resource configuration is of a normal type, and responsive to the determining, prohibiting the UE from sending a Power Preference Indication (PPI) for a radio resource configuration of the normal type. Also disclosed is a method at a UE comprising: determining that a current radio resource configuration is of a power optimized type, and responsive to the determining, prohibiting the UE from sending a PPI for a radio resource configuration of the power optimized type. Also disclosed is a UE including a processor, the UE configured to: determine that a current radio resource configuration is of a normal type, and responsive to the determining, refrain from sending a PPI for a radio resource configuration of the normal type.

15 Claims, 20 Drawing Sheets

(56) References Cited

U.S. PATENT DOCUMENTS

| | | | |
|---|---|---|---|
| 2004/0120253 | A1 | 6/2004 | Forssell et al. |
| 2005/0026597 | A1 | 2/2005 | Kim et al. |
| 2005/0185613 | A1 | 8/2005 | Kowalski et al. |
| 2006/0094478 | A1 | 5/2006 | Kim et al. |
| 2006/0223537 | A1 | 10/2006 | Kojima |
| 2007/0135080 | A1 | 6/2007 | Islam et al. |
| 2007/0270140 | A1* | 11/2007 | Islam et al. ............... 455/423 |
| 2008/0212542 | A1 | 9/2008 | Kung et al. |
| 2009/0042560 | A1 | 2/2009 | Islam et al. |
| 2009/0129339 | A1 | 5/2009 | Young et al. |
| 2009/0131094 | A1* | 5/2009 | Natsume ................. 455/522 |
| 2013/0235780 | A1* | 9/2013 | Kim ................ H04W 52/0216 370/311 |
| 2014/0315567 | A1* | 10/2014 | Ibrahim et al. ............ 455/452.2 |

FOREIGN PATENT DOCUMENTS

| | | | |
|---|---|---|---|
| WO | 0062449 | A1 | 10/2000 |
| WO | 2007073118 | A1 | 6/2007 |
| WO | 2007097670 | A1 | 8/2007 |
| WO | WO 2012067406 | A2 * | 5/2012 ........ H04W 52/0216 |

OTHER PUBLICATIONS

Suzuki, Takashi, et al.; U.S. Appl. No. 12/616,024, filed Nov. 10, 2009; Title: Method and Apparatus of Transition to a Battery Efficient State or Configuration by Indicating End of Data Transmission in Long Term Evolution.
Islam, Muhammad Khaledul, et al.; U.S. Appl. No. 11/302,263, filed Dec. 14, 2005; Title: Method and Apparatus for User Equipment Directed Radio Resource Control in a UMTS Network.
Islam, Muhammad Khaledul, et al.; U.S. Appl. No. 11/464,380, filed Aug. 14, 2006; Title: Method and System for Signaling Release Cause Indication in a UMTS Network.
Islam, Muhammad Khaledul, et al.; U.S. Appl. No. 12/195,018, filed Aug. 20, 2008; Title: Method and System for a Signaling Connection Release Indication.
Young, Gordon Peter, et al.; U.S. Appl. No. 12/270,522, filed Nov. 13, 2008; Title: Method and Apparatus for State/Mode Transitioning.
3GPP TS 23.203 V8.7.0; 3rd Generation Partnership Project; Technical Specification Group Services and System Aspects; Policy and Charging Control Architecture; Release 8; Sep. 2009; 114 pages.
3GPP TS 23.401 V8.7.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Sep. 2009; 234 pages.
3GPP TS 25.331 V7.0.0; 3rd Generation Partnership Project; Technical Specification Group Radio Access Network; Radio Resource Control (RRC); Protocol Specification; Release 7; Mar. 2006; 1,249 pages.
European Examination Report; Application No. 08154976.8; Aug. 10, 2009; 4 pages.
3GPP TS 36.300 V8.9.0; 3rd Generation Partnership Project; Technical Specification Group Radio Access Network; Evolved Universal Terrestrial Radio Access (E-UTRAN) and Evolved Universal Terrestrial Radio Access Network (E-UTRAN); Overall Description; Stage 2; Release 8; Jun. 2009; 159 pages.
3GPP TS 36.300 V11.4.0; 3rd Generation Partnership Project; Technical Specification Group Radio Access Network; Evolved Universal Terrestrial Radio Access (E-UTRAN) and Evolved Universal Terrestrial Radio Access Network (E-UTRAN); Overall Description; Stage 2; Release 11; Dec. 2012; 208 pages.
3GPP TS 36.304 V8.6.0; 3rd Generation Partnership Project; Technical Specification Group Radio Access Network; Evolved Universal Terrestrial Radio Access (E-UTRA); User Equipment (UE) Procedures in Idle Mode; Release 8; Jun. 2009; 30 pages.
3GPP TS 36.304 V11.2.0; 3rd Generation Partnership Project; Technical Specification Group Radio Access Network; Evolved Universal Terrestrial Radio Access (E-UTRA); User Equipment (UE) Procedures in Idle Mode; Release 11; Dec. 2012; 33 pages.
3GPP TS 36.321 V8.7.0; 3rd Generation Partnership Project; Technical Specification Group Radio Access Network; Evolved Universal Terrestrial Radio Access (E-UTRA) Medium Access Control (MAC) Protocol Specification; Release 8; Sep. 2009; 47 pages.
3GPP TS 36.321 V10.7.0; 3rd Generation Partnership Project; Technical Specification Group Radio Access Network; Evolved Universal Terrestrial Radio Access (E-UTRA); Medium Access Control (MAC) Protocol Specification; Release 10; Dec. 2012; 54 pages.
3GPP TS 36.331 V11.1.0; 3rd Generation Partnership Project; Technical Specification Group Radio Access Network; Evolved Universal Terrestrial Radio Access (E-UTRA); Radio Resource Control (RRC); Protocol Specification; Release 11; Sep. 2012; 325 pages.
3GPP TS 36.423 V11.3.0; 3rd Generation Partnership Project; Technical Specification Group Radio Access Network; Evolved Universal Terrestrial Radio Access Network (E-UTRAN); X2 Application Protocol (X2AP); Release 11; Dec. 2012; 141 pages.
3GPP TS 36.331 V8.6.0; 3rd Generation Partnership Project; Technical Specification Group Radio Access Network; Evolved Universal Terrestrial Radio Access (E-UTRA) Radio Resource Control (RRC); Protocol Specification; Release 8; Jun. 2009; 207 pages.
3GPP TS 36.331 V11.2.0; 3rd Generation Partnership Project; Technical Specification Group Radio Access Network; Evolved Universal Terrestrial Radio Access (E-UTRA); Radio Resource Control (RRC); Protocol Specification; Release 11; Dec. 2012; 340 pages.
3GPP TSG RAN WG2 #63bis; "LTE CP Session Report"; R2-085921; Prague, Czech Republic; Sep. 29-Oct. 3, 2008; 38 pages.
3GPP TSG-RAN WG2 meeting #63bis; "Introduction of Signalling Connection Release Indication"; R2-085584; Prague, Czech Republic; Sep. 29-Oct. 3, 2008; 5 pages.
3GPP TSG-RAN2 Meeting #63bis; "Fast Dormancy: A Way forward"; R2-085134; Prague, Czech Republic; Sep. 29-Oct. 3, 2008; 13 pages.
3GPP TSG-RAN WG2 Meeting #60; "UE "Fast Dormancy" Behaviour"; R2-074848; Nov. 5-9, 2007; Jeju, South Korea; 9 pages.
3GPP TSG-RAN WG2 Meeting #63; "Fast Dormancy: A Way Forward"; R2-084647; Jeju, South Korea; Aug. 18-22, 2008; 14 pages.
3GPP TSG-RAN-WG2 Meeting #62bis; "Fast Dormancy Alternatives"; R2-083626; Warsaw, Poland; Jun. 30-Jul. 4, 2008; 11 pages.
3GPP TSG RAN Meeting #53; "Work Item Proposed Update for LTE RAN Enhancements for Diverse Data Applications"; RP-111372; Fukuoka, Japan; Sep. 13-16, 2011; 6 pages.
3GPP TSG RAN WG2 Meeting #78; "DRX Configuration Setting Enhancements"; R2-122252; Prague, Czech Republic; May 21-25, 2012; 2 pages.
3GPP TSG RAN WG2 Meeting #78; "Analysis of UE Assistance Information for eDDA"; R2-122159; Prague, Czech Republic; May 21-25, 2012; 6 pages.
PCT International Search Report; Application No. PCT/GB2013/050644; May 16, 2013; 3 pages.
PCT Written Opinion of the International Searching Authority; Application No. PCT/GB2013/050644; May 16, 2013; 7 pages.
PCT International Search Report; Application No. PCT/US2009/063912; May 3, 2010; 6 pages.
PCT Written Opinion of the International Searching Authority; Application No. PCT/US2009/063912; May 3, 2010; 16 pages.
PCT International Search Report and Written Opinion of the International Searching Authority; Application No. PCT/CA2008/002000; Feb. 13, 2009; 10 pages.
PCT International Search Report and Written Opinion of the International Searching Authority; Application No. PCT/CA2008/002001; Feb. 2, 2009; 10 pages.

(56) References Cited

OTHER PUBLICATIONS

PCT International Search Report and Written Opinion of the International Searching Authority; Application No. PCT/CA2008/002002; Jan. 15, 2009; 10 pages.
European Examination Report; Application No. 07121138.7; Sep. 7, 2009; 1 pages.
European Extended Search Report; Application No. 06118909.8; Nov. 24, 2006; 8 pages.
European Examination Report; Application No. 06118909.8; Nov. 12, 2007; 4 pages.
European Examination Report; Application No. 06118909.8; Jun. 25, 2008; 3 pages.
European Examination Report; Application No. 06118909.8; Jul. 30, 2009; 3 pages.
European Extended Search Report; Application No. 08154976.8; Sep. 3, 2008; 7 pages.
3GPP TS 25.331 V11.4.0; 3rd Generation Partnership Project; Technical Specification Group Radio Access Network; Radio Resource Control (RRC); Protocol Specification; Release 11; Dec. 2012; 1028 pages. (Part 1: pp. 1-1,028).
3GPP TS 25.331 V11.4.0; 3rd Generation Partnership Project; Technical Specification Group Radio Access Network; Radio Resource Control (RRC); Protocol Specification; Release 11; Dec. 2012; 1028 pages. (Part 2: pp. 1,029-2,056).
European Extended Search Report; Application No. 16183314.0; Apr. 11, 2017; 14 pages.

* cited by examiner

MECHANISMS TO SUPPORT UE POWER PREFERENCE SIGNALING

FIELD OF THE DISCLOSURE

The present disclosure relates to wireless telecommunications systems and more particularly to user equipment signaling and base station or Evolved Universal Terrestrial Radio Access Network (E-UTRAN) node B (eNB) signaling in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node.

LTE may be said to correspond to Third Generation Partnership Project (3GPP) Release 8 (Rel-8 or R8) and Release 9 (Rel-9 or R9), and possibly also to releases beyond Release 9, while LTE Advanced (LTE-A) may be said to correspond to Release 10 (Rel-10 or R10) and possibly also to Release 11 (Rel-11 or R11) and other releases beyond Release 10. As used herein, the terms "legacy", "legacy UE", and the like might refer to signals, UEs, and/or other entities that comply with LTE Release 10 and/or earlier releases but do not fully comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
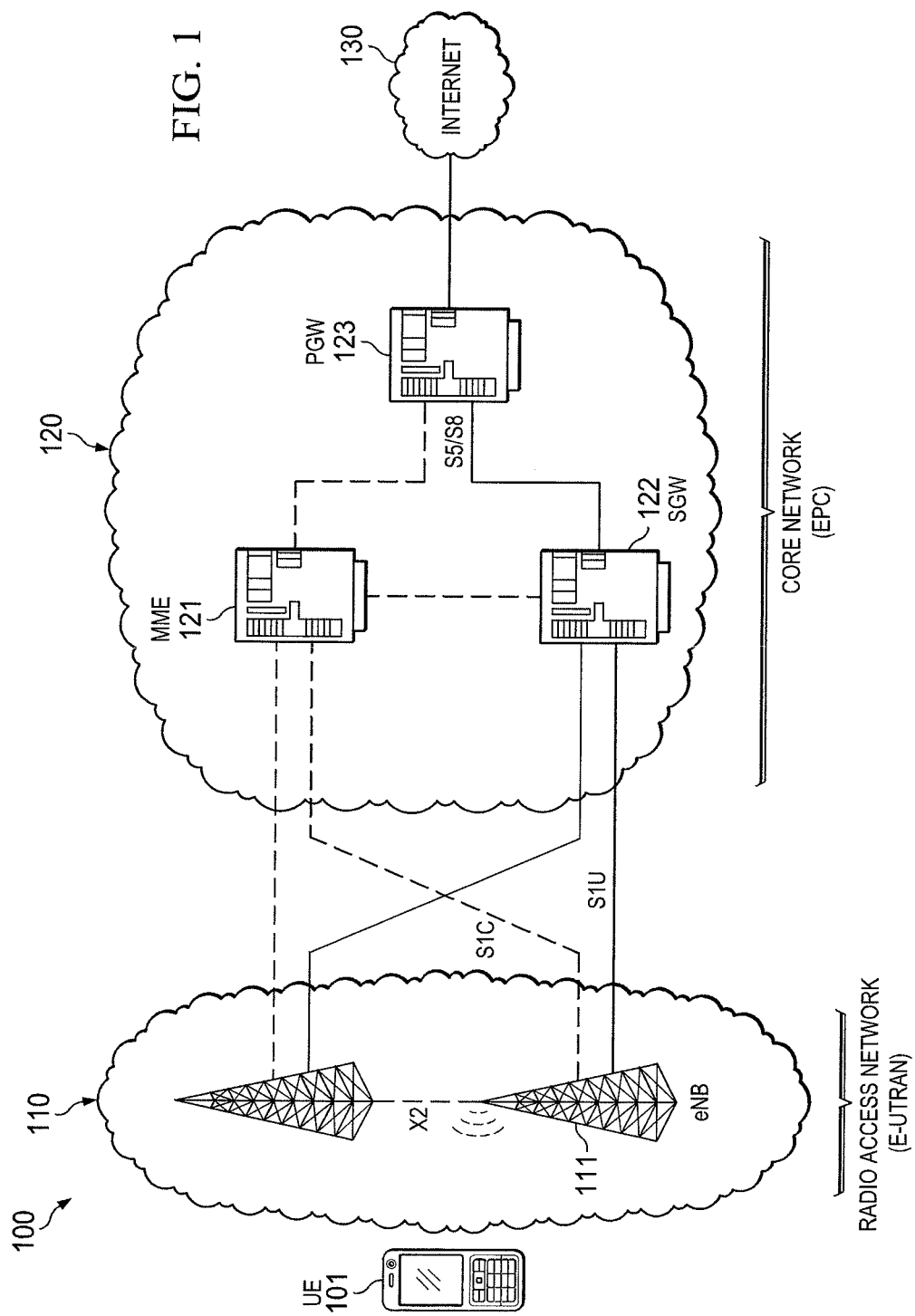
FIG. 1 illustrates an implementation of a network for connecting a UE to an external packet data network such as the public internet.

It should be understood at the outset that although illustrative implementations of one or more examples of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. implementations are described herein in the context of an LTE wireless network or system, but can be adapted for other wireless networks or systems.

Table 1 discloses various additional acronyms for terms disclosed herein:

TABLE 1

Acronyms

| Acronym | Full text |
|---|---|
| 2G/3G/4G | $2^{nd}/3^{rd}/4^{th}$ Generation |
| ACK | Acknowledgement |
| AM | Acknowledged Mode |
| AS | Access Stratum |
| CE | Control Element |
| CN | Core Network |
| CQI | Channel Quality Information |
| C-RNTI | Cell Radio Network Temporary Identifier |
| DL | DownLink |
| DL-SCH | Downlink Shared Channel |
| DRX | Discontinuous Reception |
| DSR | Dedicated Scheduling Request |
| DTX | Discontinuous Transmission |
| eNB | Evolved Node-B |
| EPC | Evolved Packet Core |
| E-UTRAN | Evolved UMTS Terrestrial Radio Access Network |
| FACH | Forward Access Channel |
| HARQ | Hybrid Automatic Repeat Request |
| HO | Handover |
| IE | Information Element |
| L1 | Layer 1 |
| L2 | Layer 2 |
| L3 | Layer 3 |
| LCID | Logical Channel Identity |
| LgCH | Logical Channel |
| LTE | Long Term Evolution |
| MAC | Medium Access Control |
| MME | Mobility Management Entity |
| N/P | Normal/Power-Optimized |
| NACK | Negative Acknowledgement |
| NAS | Non-Access Stratum |
| PCH | Paging Channel |
| PCRF | Policy Control and Rules Function |
| PDCCH | Physical Downlink Control Channel |
| PDN | Packet Data Network |
| PDU | Protocol Data Unit |
| PGW | PDN Gateway |
| PHY | Physical Layer |
| PPI | Power Preference Indication |
| PRACH | Physical Random Access Channel |
| PRB | Physical Resource Block |
| PUCCH | Physical Uplink Control Channel |
| PUSCH | Physical Uplink Shared Channel |
| QCI | QoS Class Index |
| QoE | Quality of Experience |

TABLE 1-continued

Acronyms

| Acronym | Full text |
|---|---|
| QoS | Quality of Service |
| RAB | Radio Access Bearer |
| RACH | Random Access Channel |
| RAN | Radio Access Network |
| RAT | Radio Access Technology |
| RB | Resource Block |
| RLC | Radio Link Control |
| RLF | Radio Link Failure |
| RNC | Radio Network Controller |
| RRC | Radio Resource Control |
| RRM | Radio Resource Management |
| RX | Receive |
| S1 | (E-UTRAN to EPC interface) |
| S5/S8 | (Intra-CN interfaces) |
| SGW | Serving Gateway |
| SIB | System Information Block |
| SPS | Semi-Persistent Scheduling |
| SR | Scheduling Request |
| SRS | Sounding Reference Signal |
| TAT | Timing Alignment Timer |
| TX | Transmit |
| UE | User Equipment |
| UL | UpLink |
| UL-SCH | Uplink Shared Channel (transport channel) |
| UMTS | Universal Mobile Telecommunications System |
| URA | UTRAN Registration Area |
| UTRAN | UMTS Terrestrial Radio Access Network |
| X2 | (Inter-eNB interface) |

Cellular telecommunications networks may be designed based on traffic profiles that comprise clearly demarcated periods of inactivity and activity (e.g. packet calls). In this implementation, a UE may enter RRC connected mode(s) during periods of activity and enter idle mode during inactive periods, which may provide significant battery and system resource savings. This design may be based on the presumption that transitions between RRC connected modes and idle mode occur relatively infrequently as such transitions may be based on user interaction timescales and not on machine interaction timescales. The design may also be based on the assumption that when a UE is in connected mode, the UE is involved in a relatively high degree of data activity.

However, modern applications on smartphone devices and tablets may exhibit data traffic profiles with an unclear demarcation between active and inactive periods. For example, many applications exhibit a continued small/residual activity without user interaction. Such activity may comprise short autonomous background machine based communications such as keepalives, email and chat server status checks, and the like. Furthermore, user-interactive applications such as instant messaging may employ low average user data volumes, which comprise short packets that are widely dispersed in time. Such traffic types fail to conform to the clearly-demarcated active/inactive paradigm, yet their prevalence in the real-world has dramatically increased since LTE was first designed.

The presence of background application traffic, machine based interactions, and other regular or sporadic infrequent short data exchanges can cause suboptimal performance in cellular networks. Depending upon network configuration, these network traffic types may result in situations where (1) the frequency of RRC state transitions becomes high and signaling overheads and congestion are increased; or (2) idle mode is seldom used because the background activity retains the device in an RRC connected mode state. As UEs may be evolving rapidly to accommodate new applications, networks, such as LTE, may be updated to accommodate the traffic generated by the diverse applications used with these UEs.

FIG. 1 illustrates an implementation of a network 100 for connecting a UE 101 to an external packet data network such as the public internet 130. The network 100 may comprise a RAN 110, such as a LTE E-UTRAN, connected to core network (EPC) 120, such as an Evolved Packet Core Network. The RAN 110 and the EPC 120 may be connected as shown in FIG. 1. The UE 101 may wirelessly connect to the RAN 110, which may pass transmissions to the EPC 120, for transmission to the internet 130. The RAN 110 may comprise nodes such as an eNB 111. The EPC 120 may comprise nodes such as a Mobility Management Endpoint (MME) 121, a Serving Gateway (SGW) 122, and a Packet Gateway (PGW) 123, which may be connected as shown in FIG. 1.

The eNB 111 may pass data between the UE 101 and the EPC 120. The SGW 122 may route user-plane data within the EPC 120, the MME 121 may handle mobility and connection control between the UE 101 and the EPC 120, and the PGW 123 may act as an ingress/egress node by routing data between the EPC 120 and external networks which make up the internet 130. LTE networks (e.g. RAN 110) may support two RRC states, which may be known as Idle Mode and Connected Mode, respectively.

A UE 101 in the RRC connected mode may maintain its connections with the network 100 along with a corresponding context held by both the UE 101 and the network 100. Mobility between network cells may be network-controlled, and may be assisted by measurement reports of neighboring network cells. Such measurement reports may be sent by the UE 101 to the network 100. The UE 101 may be in a Connected Mode in order to exchange user-plane data with the network 100.

A UE 101 in an RRC Idle mode may not maintain its connection with the eNB 111 and may not be able to exchange user-plane data with the eNB 111. The eNB 111 may therefore release all radio resources associated with the UE 101. Mobility in the RRC idle mode may be UE, as opposed to network controlled, and may be based on network cell selection and reselection processes as described in 3GPP TS 36.304, which is incorporated by reference. The UE 101 may periodically monitor a paging channel. Whenever the UE 101 receives a paging message from the eNB 111 on a downlink, or whenever the UE 101 has buffered data to transmit an uplink, the UE 101 may use a physical random access channel (PRACH) to send a service request to the eNB 101. This may result in the instantiation of context information at both the UE 101 and the network 100 and may result in the subsequent establishment of a connection between the UE 101 and the eNB 111, which may enable the transmission of user-plane data to/from the UE 101. The period with which the UE 101 monitors the paging channel is known as the idle mode DRX cycle and may be configured and controlled by the network 100.

One of the key parameters impacting user experience and device usability is the duration for which a UE 101 can operate between charges. Duration of operation may be a direct function of the UE's 101 battery capacity and the power consumption in the UE 101. Enhancements to reduce overall power consumption may extend the period of time over which the UE 101 may be used without charging.

Optimizations to reduce power consumption at the radio level may be of particular relevance. The LTE system 110 may offer a number of features to help enable reduced UE 101 power consumption, and some of these features and some aspects of such features are discussed herein.

Figure 2:
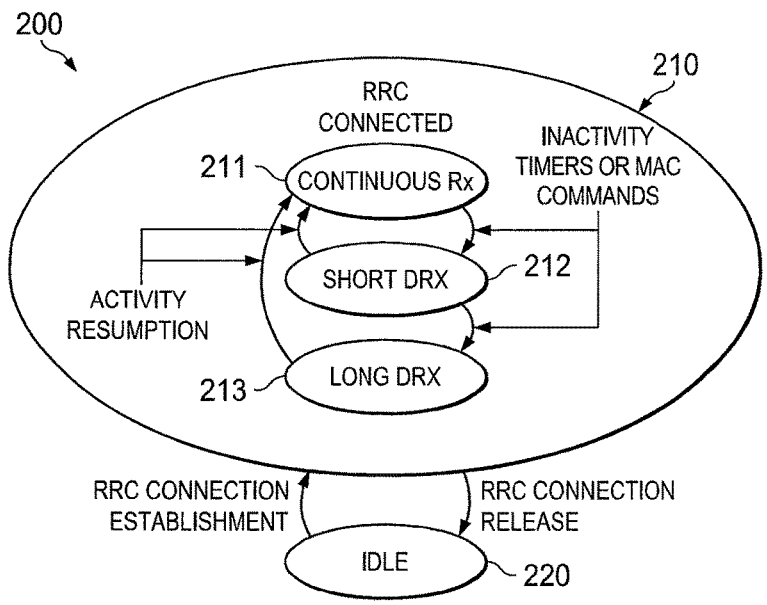
FIG. 2 illustrates an example of a UE's connection states when connected to a LTE network.

FIG. 2 illustrates an example of a UE's connection states 200 when connected to a LTE network. The UE may enter an RRC connection mode 210 or an idle mode 220. The RRC connection mode 210 may comprise a continuous RX substate 211, a short DRX substate 212, and a long DRX substate 213. The UE may transition between states and substates as shown in FIG. 2.

In order to reduce UE battery consumption during an RRC connection mode 210, a LTE system may support DRX substates, which may comprise modes of operation in which the UE receiver is not required to monitor for incoming (e.g. downlink) data at all times. One of the RRC connection substates 211, 212, or 213 may be employed at any one time. The Continuous RX substate 211 may employ no DRX and may require the UE to continuously monitor for incoming data.

In the absence of traffic, the UE may enter the short DRX substate 212. During active communications, the UE may receive a plurality of sub-frames, which may comprise a 1 ms unit of transmission time in an LTE system. In the short DRX substate 212, the sub-frames may be grouped into an Nshort grouping of subframes. In the short DRX substate 212, the UE may be allowed to turn off its receiver (e.g. sleep, or DRX) for all but about 1 or some other small number of Nshort sub-frames, where Nshort may be a relatively small value (e.g. between about 8 and about 640).

In the continued absence of traffic, the UE may be allowed to transition to the long DRX substate 213, which may group the sub-frames into an Nlong grouping of sub-frames. In the long DRX substate 213, the UE may be allowed to turn off its receiver (e.g. sleep, or DRX) for all but about 1 or some other small number of Nlong sub-frames, where Nlong is typically a relatively large value, such as about 320 to about 2560.

As depicted in FIG. 2, transitions between these basic DRX substates 211-213 may move in the direction of longer cycles in the continued absence of traffic. The transitions may be controlled by data inactivity timers, which may run towards expiration as long as no new data is exchanged, and may be reset whenever new data is exchanged. Alternatively, the transitions may be controlled by explicit MAC commands transmitted by an eNB to the UE. When in either the short or the long DRX cycle, the communication of new downlink or uplink data may results in a return to the continuous RX sub-state 211. Transitions between the idle mode 220 and the RRC connected mode 210 may be effected via explicit RRC connection establishment and/or setup and release procedures and may incur some associated signaling overheads.

For correct system operation the eNB and the UE may be synchronized regarding exactly which sub-frames are categorized as DRX (e.g. the UE receiver may sleep) and which are not (the UE receiver may not sleep). To enable such co-ordination, various timers may be may be identically configured in both the UE and the eNB in order to implicitly determine the DRX activity pattern in the time domain.

Figure 3:
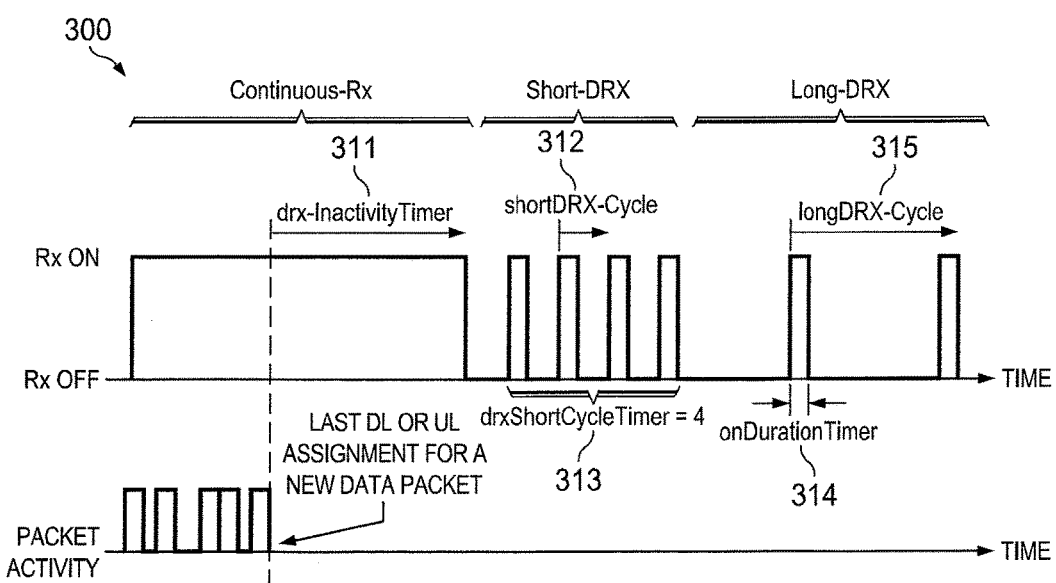
FIG. 3 illustrates an example of a discontinuous (DRX) pattern in the time domain following the end of a burst of data transmission.

FIG. 3 illustrates an example of a DRX reception pattern 300 in the time domain following the end of a burst of data transmission. While DRX may offer an efficient method to achieve low UE power consumption, DRX may result in an increased risk of latency for the downlink traffic. This is because it may not be possible to immediately transmit a packet to the UE if that UE is not actively receiving at the same instant in time. A trade-off often exists between latency and battery efficiency, and DRX settings may be selected to achieve a compromise between downlink latency and power savings.

The MAC layers in the UE and eNB may be responsible for determining the time-domain DRX pattern as a function of both the configured timer/parameter values and of data activity events that are commonly known to the UE and eNB, such as the exchange of new data packets. The eNB may internally configure its own MAC layer with these DRX timer/parameter values. To configure the UE MAC layer, the eNB may transmit the DRX timer/parameter values to the UE via the RRC layer, and the UE may apply the received values to the MAC layer. A change to the DRX configuration may require a further exchange of signaling at the RRC layer to convey the new timer or parameter values. To accomplish this, the eNB may send an RRC Reconfiguration message to the UE.

3GPP Technical Specifications 36.321 and 36.331 define the DRX-related timers and parameters that may configurable by the RRC layer and may be used by the MAC layer. The timers and parameters may include a drx-InactivityTimer 311, a shortDRX-Cycle 312, a drxShortCycleTimer 313, an onDurationTimer 314, and a longDRX-Cycle 315. A drx-InactivityTimer 311 may comprise the time during which the UE receiver may be continuously enabled following reception of a PDCCH that indicates a new uplink or downlink packet communication will take place. A shortDRX-Cycle 312 may comprise the period of a short DRX pattern/duty-cycle. A drxShortCycleTimer 313 may comprise the number of periods of a short DRX cycle that the UE will remain in the short DRX sub-state, if inactivity continues, before transitioning to Long DRX substate. An onDurationTimer 314 may comprise the number of sub-frames for which the UE's receivers may be active at the start of each DRX cycle period. A longDRX-Cycle 315 may comprise the period of a long DRX pattern/duty-cycle. Based on the foregoing, the total length of time that a UE will remain in short DRX when inactive is equal to (shortDRX-Cycle*drxShortCycleTimer) ms. In an implementation, the use of long and/or short DRX may be applied as configured by the eNB and not configured by the UE. If DRX is not configured by the eNB in an implementation, DRX may not employed by the UE.

TABLE 2

RRC signalling of DRX parameters and values (eNB to UE)
The hierarchical structure of RRC messaging that may facilitate the eNB's configuration and reconfiguration of the various DRX-associated parameters and timer values in the UE are shown in Table 2 below. The hierarchical structure of a message is shown in relation to how the message conveys the DRX-related configuration information. Other configuration information has been omitted for purposes of clarity. The top level may comprise RRC messages. Items listed from the next (2nd) level down, comprise IEs in the RRC messages. [RRCConnectionSetup] OR [RRCConnectionReconfiguration] OR [RRCConnection Reestablishment]

RadioResourceConfigDedicated
        mac-MainConfig
            drx-Config
                onDurationTimer
                drx-InactivityTimer
                drx-RetransmissionTimer
                longDRX-CycleStartOffset
                shortDRX
                    shortDRX-Cycle
                    drxShortCycleTimer The DRX configuration information for a particular UE may also be exchanged between a source eNB and a target eNB during handover via an information element such as a HandoverPreparationInformation IE. An IE may be sent by the source eNB directly to the target eNB within messages carried over the X2 interface, or may be sent to the target eNB indirectly via an intermediate node within the core network, via a MME. When the IE is carried via a MME, the IE is carried within messages over the S1 interface. Upon receipt of the information, the target eNB may use the information to determine the need for reconfiguration of DRX parameters, or to populate DRX configuration parameters within an RRCConnectionReconfiguration message which may be generated by the target eNB and tunneled to the UE via the source eNB to instruct a handover.

The hierarchical structure of a HandoverPreparationInformation IE is shown in Table 3 below in relation to how the IE conveys the DRX-related configuration information. Other configuration information is omitted for clarity.

TABLE 3

Signaling of DRX parameters and values between source and target eNBs prior to Handover

[HandoverPreparationInformation]
    as-Config
        sourceRadioResourceConfigDedicated
            RadioResourceConfigDedicated
                mac-MainConfig
                    drx-Config
                        onDurationTimer
                        drx-InactivityTimer
                        drx-RetransmissionTimer
                        longDRX-CycleStartOffset
                        shortDRX
                            shortDRX-Cycle
                            drxShortCycleTimer An LTE system may be designed around the premise that connected mode is used only for UEs with immediate data activity. Therefore, LTE system designers may assume that on entering an RRC connection mode, a UE will be semi-statically assigned dedicated control channel resources for SR, CQI/PMI/RI reporting, and SRS. During SR, a DSR may be reserved on the PUCCH and used to request access to the PUSCH for uplink data transmission. During CQI/PMI/RI reporting, dedicated resources may be reserved on PUCCH to transmit information related to channel status or quality. During SRS, dedicated resources may be used to enable sounding of the uplink radio channel and subsequent channel estimation by an eNB.

Dedicated uplink control resources may be transmitted on uplink system resources that require timing synchronization between simultaneously-transmitting UEs. The uplink control resources may be retained within the connected mode so long as a TAT is running. The TAT may be reset to a preconfigured value each time an uplink timing advance command is received by the UE from the eNB. If a timing advance command is not received for a period of time equal to a preconfigured value, the TAT may expire causing the dedicated uplink control resources to be released by the UE. The UE may then use the RACH procedure to regain timing alignment and to be eligible to receive a new configuration of any dedicated uplink control resources. The TAT preconfigured value may be signaled to the UE via the RRC layer. The value may be set in accordance with the expected mobility speeds of the UEs within a cell, or may be set based on cell size. For example, a TAT preconfigured value may be larger for lower speed UEs. Alternatively, in smaller cells the TAT preconfigured value may be set to never expire due to the fact that the relative propagation delays experienced between each UEs in the cell and the eNB may be relatively similar, which may ensure sufficient uplink synchronization between users without the need for timing advance correction.

During times when uplink control channel resources are configured for a connected mode UE, there may be relatively frequent transmission on these resources by the UE, which may result in increased battery consumption. An expenditure of UE battery power may be wasted if not accompanied by associated user-plane data transmission. This is especially likely if the user-plane data is infrequent, sparse, or sporadic in nature. To avoid expenditure of UE battery power and to avoid unnecessary consumption of uplink system resources, a network may keep the UE in connected mode without configuring certain periodic uplink control channel resources. For example, the network may configure the UE to not transmit SRS, or some or all of the channel status or channel quality information. Additionally or alternatively, the network may not configure the UE with DSR resources in which case the UE may instead use RACH to transmit its request for uplink shared channel resources. In a further example, the network may configure the UE with a short preconfigured value for the TAT, and may refrain from transmitting a timing advance command to the UE during times of data inactivity. This process may be used to reduce the time that the uplink control resources remain configured during times of data inactivity.

Such measures may enable a more power optimal or more resource efficient configuration for a connected mode UE, but may be some associated drawbacks. For example, the eNB may have reduced information or less accurate knowledge of the downlink or uplink radio channels, leading to reduced spectral efficiency, or an increased latency for uplink access may be experienced. In the case of short TAT values, the eNB may be required to provide faster timing advance updates during times of data activity in order to avoid unintentional TAT expiry and the associated uplink control channel release. There may also be additional RRC signaling overheads associated with the need to more frequently re-assign uplink control channel resources to the UE.

Uplink control channel resources and parameters may be configured or reconfigured in the UE by the eNB. To accomplish this, the eNB may send a PhysicalConfigDedicated IE to the UE within an RRC message such as RRCConnectionSetup, RRCConnectionReconfiguration, and RRCConnectionReestablishment. Parameters and values for each uplink control channel type may then contained within separate and/or different IEs embedded within the PhysicConfigDedicated IE.

A simplified overview of an RRC signaling structure to configure UL control channels is shown in table 4 below:

TABLE 4

Signalling of UL Control Channel parameters and values (eNBs to UE)

[RRCConnectionSetup] OR [RRCConnectionReconfiguration] OR
[RRCConnectionReestablishment]
    RadioResourceConfigDedicated
        PhysicalConfigDedicated
            SchedulingRequestConfig
                <parameters (not shown)>
            cqi-ReportConfig
                <parameters (not shown)>
            SoundingRS-UL-ConfigDedicated
                <parameters (not shown)>
            pucch-ConfigDedicated
                <parameters (not shown)>

The Timing Alignment Timer (TAT) preconfigured value may be signaled to the UE either using common signaling such as broadcast within SIB 2, or using dedicated signaling. These two possibilities are shown below in tables 4 and 5, respectively.

TABLE 5

Common signaling of TAT preconfigured value (eNBs to UE)

[SystemInformationBlockType2]
    timeAlignmentTimerCommon
        TimeAlignmentTimer

TABLE 6

Dedicated signaling of TAT preconfigured value (eNBs to UE)

[RRCConnectionSetup] OR [RRCConnectionReconfiguration] OR
[RRCConnectionReestablishment]
    RadioResourceConfigDedicated
        mac-MainConfig
            timeAlignmentTimerDedicated
                TimeAlignmentTimer Idle mode may be characterized by a long DRX cycle with a periodic short duration wakeup by the UE to check the paging channels. Idle mode may be the mode that offers lowest UE power consumption. However, the associated latency for any user plane traffic is also the highest in case of idle mode due to the fact that a full RRC connection establishment procedure may be completed before user plane data can be exchanged. Additionally, control-plane signaling loads may be increased due to RRC signaling exchanges necessary to transition the UE between idle and connected RRC modes.

Figure 4:
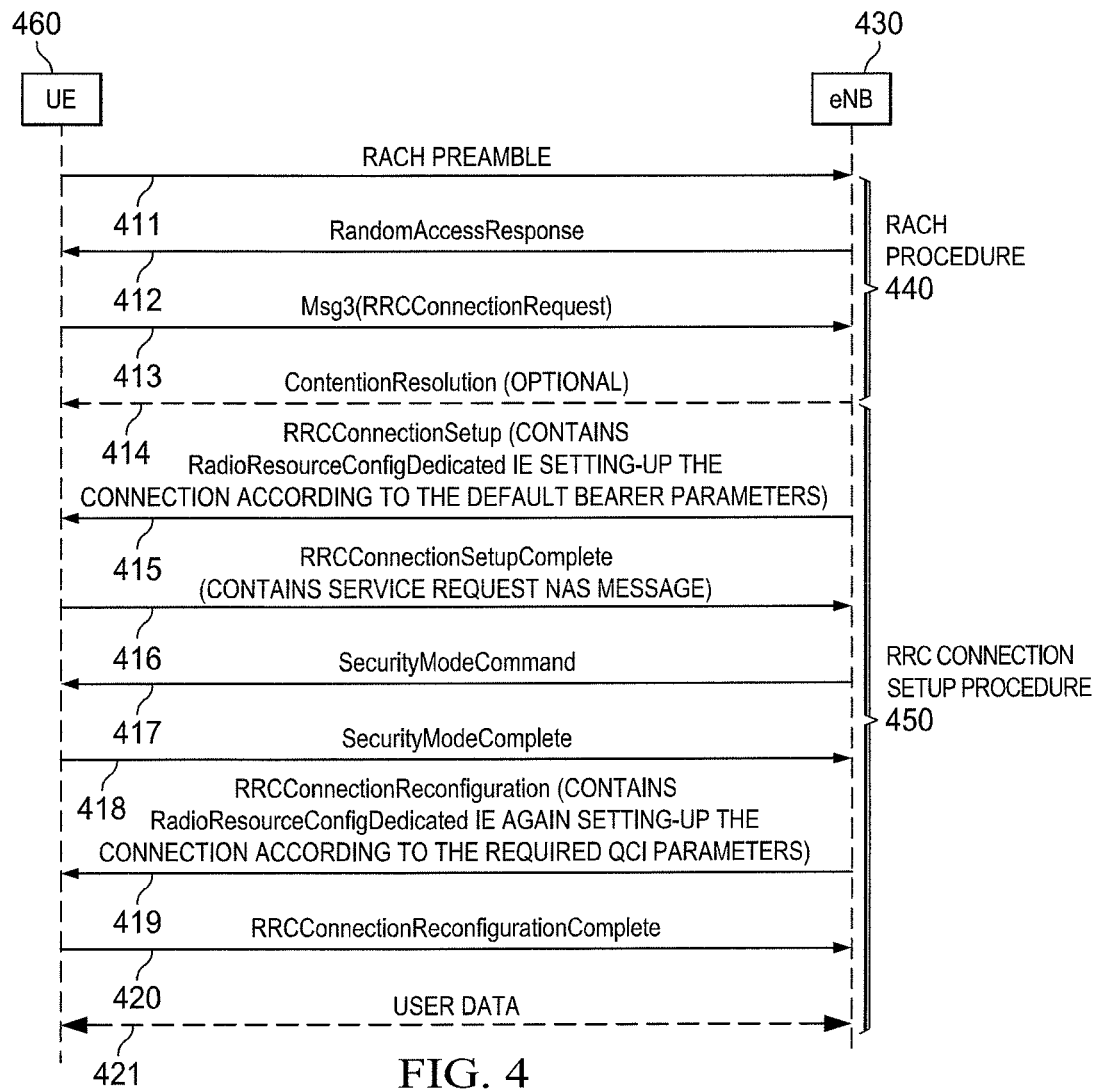
FIG. 4 illustrates an implementation of a UE Radio Resource Control (RRC) connection setup procedure.

FIG. 4 illustrates an implementation of a UE RRC connection procedure 400. The procedure 400 comprises a RACH procedure 440 and a RRC Connection Setup procedure 450. In LTE a UE 460 that requires sending or receiving user plane data connectivity may transition to connected mode. The UE 460 can move from idle mode to connected mode via the RRC connection procedure. During the RACH procedure 450, the UE 460 may transmit a RACH preamble to an eNB 430 in step 411. The eNB 430 may respond to the RACH preamble with a RandomAccessResponse in step 412. In step 413, the UE 460 may transmit an RRCConnectionRequest to the eNB 430. The eNB 430 may respond in optional step 414 by sending an optional Connectionresolution message to the UE 460. Upon completion of the RACH procedure 440, the RRC Connection Setup procedure 450 may be initiated. In step 415, the eNB 430 may send an RRCConnectionSetup message to the UE 460. The RRCConnectionSetup message may comprise a RadioResourceConfigDedicated IE which may be employed to set up a connection according to default bearer parameters. In step 416, the UE 460 may respond with an RRCConnectionSetupComplete message, which may contain a Service Request NAS message. In step 417, the eNB 430 may send a SecurityModeCommand message to the UE 460. In step 418, the UE 460 may respond with a SecurityModeComplete message. In step 419, the eNB 430 may transmit an RRCconnectionReconfiguration message to the UE 460. The RRCconnectionReconfiguration message may comprise a RadioResourceConfigDedicated IE which may be employed to setup the connection according to any required QCI parameters. The RRCconnectionReconfiguration message of step 419 may be transmitted before or after the SecurityModeComplete message of step 418 is received from the UE 460. In step 420, the UE 460 may respond to the RRCconnectionReconfiguration message with an RRC-ConnectionComplete message. In step 421, the UE 460 and the eNB 430 may then transmit user data as needed. It can be seen from FIG. 4 that during the connection setup procedure 400, the RadioResourceConfigDedicated IE may be sent to the UE 460 and used to configure the connected mode parameters as discussed above.

Figure 5:
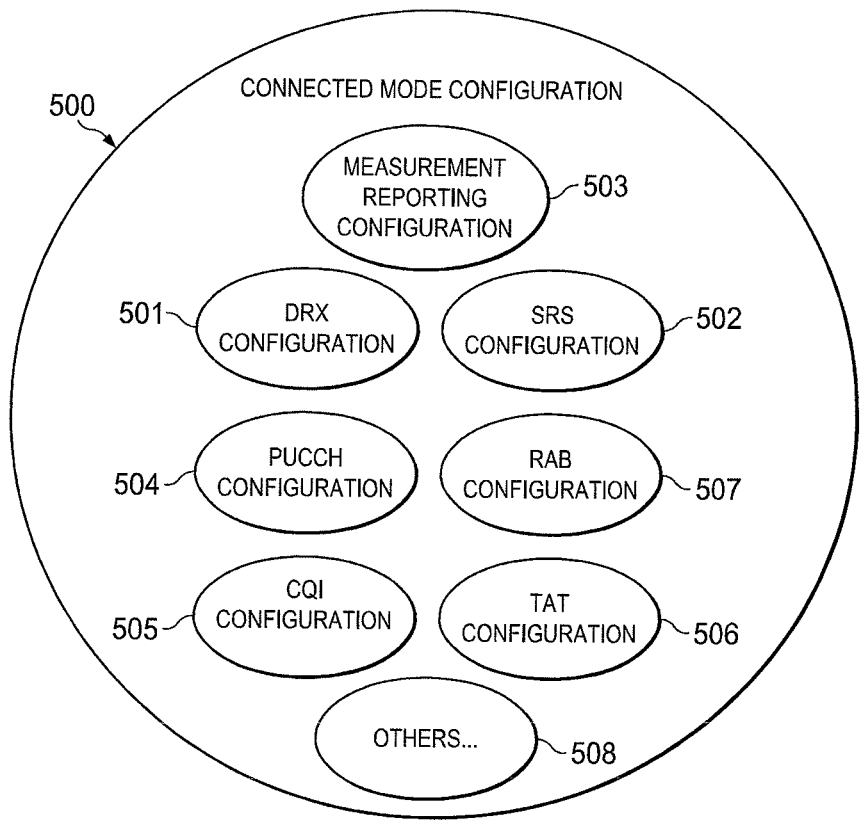
FIG. 5 illustrates an aspect of UE connected mode configuration parameters.

FIG. 5 illustrates an aspect of UE connected mode configuration 500 parameters. The UE connected mode configuration 500 may comprises a wide range of parameters, settings, and values which may be used to control a similarly wide range of functionality, behavioral aspects, and features of a communication between a UE and a network. These may include DRX configuration 501, SRS configuration 502, Measurement and Reporting Configuration 503, PUCCH configuration 504, CQI configuration 505, RAB configuration 506, TAT configuration 507, and other parameters 508. As such, DRX configuration and UL control channel configurations play a role in power consumption and its optimization. However, other parameters and/or attributes of the overall connected mode configuration may also be considered pertinent to power optimization. A power-optimized configuration may generally refer to a specific optimization of one or more attributes/parameters of the connected mode configuration.

Figure 6:
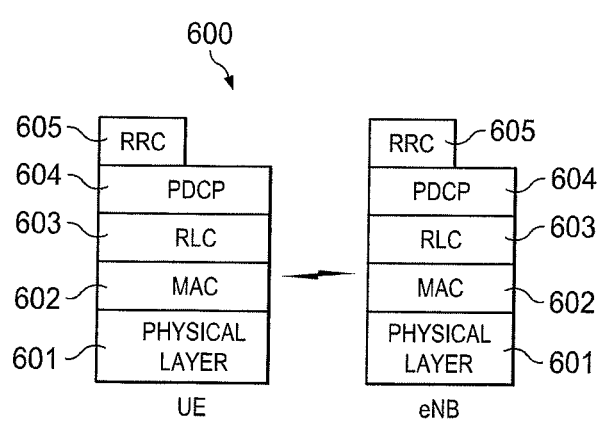
FIG. 6 illustrates an aspect of LTE network protocol layers.

FIG. 6 illustrates an aspect of LTE network protocol layers 600. Signaling between protocol peer entities at an eNB and a UE may take place at various protocol layers 600. The layers 600 may comprise a physical layer 601 (e.g. L1), a MAC layer 602 (e.g. L2), a RLC layer 603, a PDCP (Packet Data Convergence Protocol) layer 604, and a RRC layer 605. Specific communications between the UE and the eNB may be confined to a particular layer or may operate on multiple layers.

For example, A HARQ protocol may operate at the MAC layer 602 in conjunction with the physical layer 601 in order to provide robustness against radio channel fading and to deliver low residual packet loss to the layers above, in this case the RLC layer 603. A further level of retransmission control may be provided by RLC layer 603, which may operate in AM mode in order to recover, via retransmission, from data loss not corrected by the MAC layer 602 and physical layer 601. Differing levels of error robustness offered by the various protocol layers is a consideration which layer is most appropriate for a given signaling purpose. However, increasing levels of robustness may be accompanied by signaling overhead, which is also a factor.

Figure 7A:
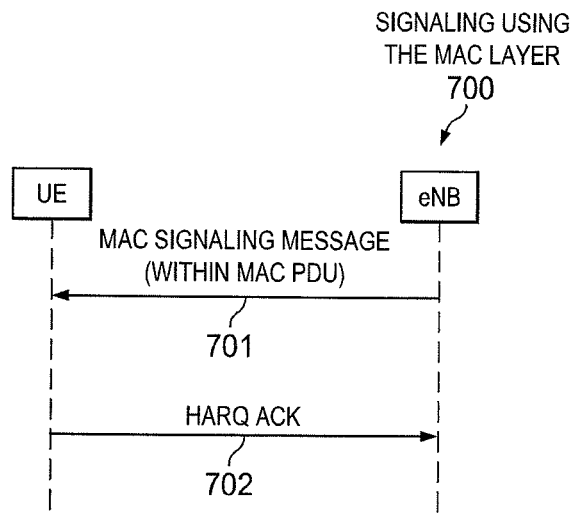
FIG. 7a illustrates an implementation of a Media Access Control (MAC) layer UE to eNB signaling procedure.
Figure 7B:
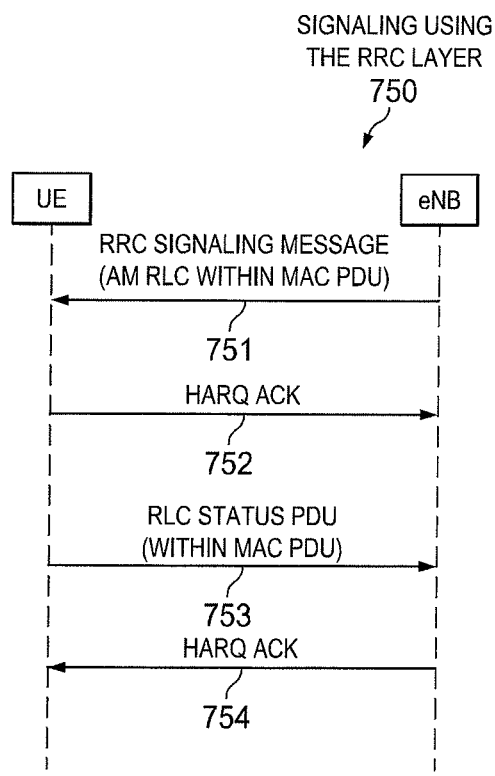
FIG. 7b illustrates an implementation of a RRC layer UE to eNB signaling procedure.

FIG. 7a illustrates an implementation of a MAC layer UE to eNB signaling procedure 700, and FIG. 7b illustrates an implementation of a RRC layer UE to eNB signaling procedure 750, respectively. RRC layer signaling 750 may be more resilient than MAC layer signaling 700, but transmission of a small message may carry a significant signaling overhead in RRC layer signaling 700 even if transmission over the physical layer is error free. In step 751, an RRC layer message may be packaged inside an AM RLC message, which may be further packaged inside a MAC PDU, and delivered to the MAC layer for transmission to the UE. Also in step 751, the MAC layer PDU may be conveyed across the physical layer to the UE. In step 752, a HARQ acknowledgement may be returned from the UE to the eNB. In step 753, the HARQ acknowledgement receiver (e.g. the eNB) may generate an RLC acknowledgement as part of a RLC status PDU, package the message within a MAC PDU, and transmit the message to the UE. The RLC status PDU may pass through the MAC layer, which may require a HARQ acknowledgement to be sent from the UE in step 754 for the MAC PDU that carries the RLC status PDU. This procedure 750 may result in a minimum of four over the air messages 751-754. In contrast, in step 701 the MAC layer may directly convey the signaling message without the involvement of the RLC layer and the resulting signaling exchange. In step 702, the UE may respond with a HARQ acknowledgement. Therefore, MAC layer signaling 701 may comprise a smaller number of over the air messages than RRC signaling 700.

Figure 8:
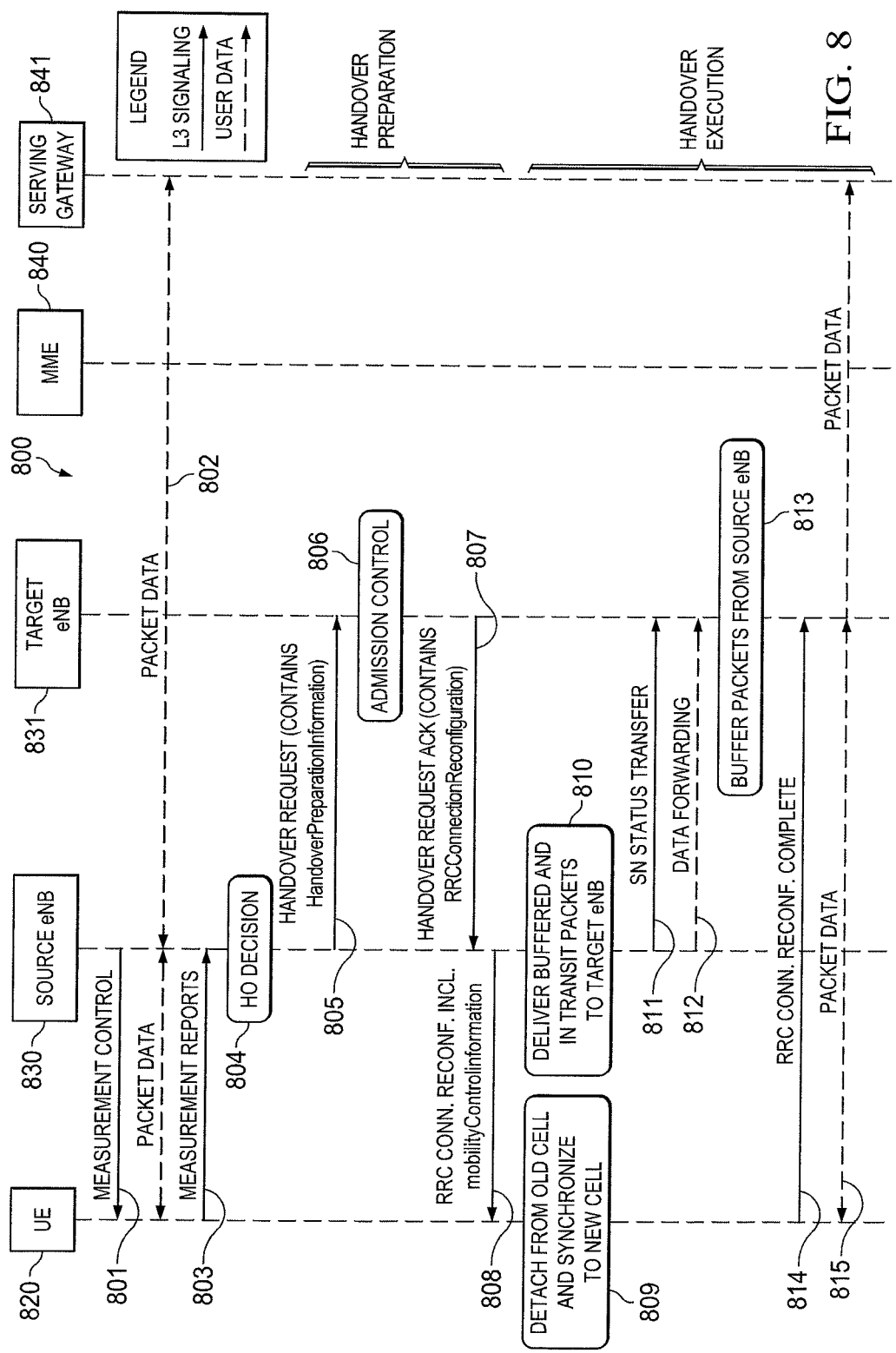
FIG. 8 illustrates an implementation of a handover procedure between two eNBs connected by an inter-eNB (X2) interface.

FIG. 8 illustrates an implementation of a handover procedure 800 between two eNBs connected by an X2 interface. In case of UE 820 connected to an LTE system, mobility may be UE 820 controlled in idle mode and network controlled in connected mode via the use of the handover procedure. A UE 820 may be connected to a serving gateway 841 via a source eNB 830 and a MME 840. In the case of UE 820 controlled mobility, in step 801 a source eNB 830 may request that the UE 820 perform measurements on neighboring cells. The UE 820 may perform the measurements in step 802, and send the measurements from step 802 the source eNB using measurement reports in step 803. In step 804, the source eNB 830 may use the measurements to make a decision to perform a cell reselection. The network can control the decision process by sending various cell reselection parameters (e.g. thresholds, offsets, used for cell selection etc) in the broadcast system information. In step 805, the source eNB 830 may send HandoverPreparationInformation to a target eNB 831 via a handover request. In step 806, the target eNB 831 may perform admission control. In step 807, the target eNB 831 may send a handover request acknowledgement, containing an RRCconnectionReconfiguration, to the to the Source eNB 830. In step 808, the source eNB 830 may send RRC connection reconfiguration information, comprising MobilityControlInformation, to the UE 820, allowing the UE to detach form the old cell in step 809 and synchronize with the new cell in step 810. In step 811, the source eNB 830 may send a SN status transfer to the target eNB 831 and begin data forwarding in step 812. In step 813, the target eNB 831 may buffer packets from the source eNB 830 for later transmission to the UE 820. In step 814, the UE 820 may send a RRC configuration complete message to the target eNB 831 and begin transferring data to and from the target eNB 831 in step 815, for transmission to the serving gateway 841 via the MME 840.

Figure 9:
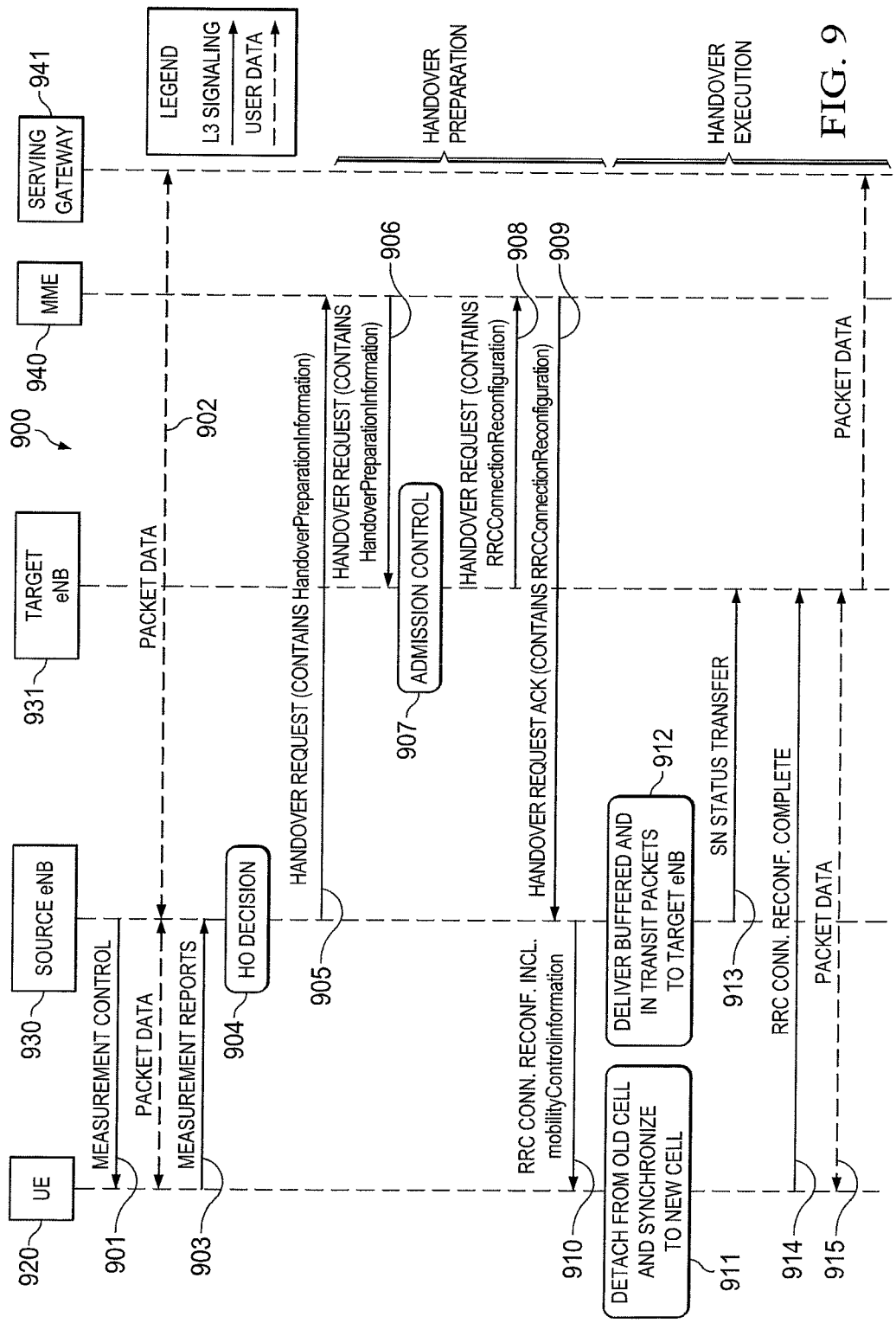
FIG. 9 illustrates an implementation of a handover procedure between two eNBs connected by a S1 interface.

FIG. 9 illustrates an implementation of a handover procedure 900 between two eNBs connected by a S1 interface. Components 920, 930-931 and 940-941 may be substantially similar to 820, 830-831 and 840-841, except source eNB 930 and target eNB 931 may be connected via an S1 interface. Steps 901-904 are substantially similar to steps 801-804. In step 905, the source eNB 930 may send a handover required message to the MME 940 containing a HandoverPreparationInformation. In step 906, the MME 940 may forward the HandoverPreparationInformation to the target eNB 931 via a handover request. In step 907, the target eNB 931 may perform admission control. In step 908, the target eNB 931 may send a handover request acknowledgement, containing an RRCconnectionReconfiguration, to the MME 940. In step 909, the MME 940 may forward the handover request acknowledgement to the source eNB 930. Steps 910-913 may be substantially similar to steps 808-811 and steps 914-915 may be substantially similar to steps 814-815.

In case of handover to another LTE cell, the target cell may configure the connected mode parameters to be used after handover and inform the UE about these parameters via the RRCConnectionReconfiguration message which is sent to the UE in both 807 and 909. In addition, as can be seen from both 804 and 904-905, the source eNB can inform to the target eNB about the current connected mode configuration parameters of the UE in the source cell by using the HandoverPreparationInformation IE, which may contain the connected mode parameters in the source cell.

A connected mode UE may monitor the quality of downlink radio link of a serving cell. If the quality deteriorates, a radio link failure (RLF) may result. As a consequence, the UE may turn off its transmitter (to avoid interference to other users) and initiate an RRC Connection Reestablishment procedure. During the procedure, the UE may clear part of its MAC and physical layer configuration, selects an appropriate cell and transmit an RRCConnectionReestablishmentRequest message. The message may contain the UE's previous C-RNTI and Physical Cell ID, which may allow the recipient cell or eNB to identify the UE and, if possible, retrieve the UE's previous RRC context (including RRC configuration data). The recipient cell or eNB may then transmit an RRCConnectionReestablishment message to the UE in order to provide the UE with an appropriate configuration. This configuration may be the same or different to its configuration prior to entering Radio Link Failure.

A cell or eNB (termed here the 'target eNB') receiving an RRCConnectionReestablishment request message from a UE may or may not be in possession of the UE's RRC context or RRC/RRM configuration information. Whether the target eNB possesses the UE's context/configuration information may depend on whether the eNB of the UE's previous cell (termed here the 'source eNB') transmitted information concerning the UE's context or configuration to the target eNB prior to the RLF event. The transmission of the UE's context/configuration information between source and target eNB may be achieved by sending a HandoverPreparationInformation IE from the source eNB to the target eNB. The HandoverPreparationInformation IE may contain a Config IE, an rrm-Config IE and/or an as-Context IE.

If the target eNB has possesses the UE's context/configuration information, it may use the information to configure the UE by sending an RRCConnectionEstablishment message. If the target eNB does not possesses the UE's context/configuration information, it may attempt to fetch the necessary information from the source eNB by using X2 forward handover procedures, in which the target eNB sends an RLF Indication message to the source eNB to request retrieval of the necessary RRM, AS-configuration or AS-context information. Tables 7 and 8 illustrate UE context signaling in the X2 handover case and the S1 handover case, respectively, as described above.

TABLE 7

Signaling of UE context between source and target eNBs prior to HO (X2 HO case)

HANDOVER REQUEST
   UE Context Information
      RRC Context
         HandoverPreparationInformation
            as-Config
               <further details not shown>

TABLE 8

Signaling of UE context between source and target eNBs prior to HO (S1 HO case)

HANDOVER REQUIRED (from source eNB to MME)
   Source to Target Transparent Container
      Source eNB to target eNB Transparent Container
         RRC Container
            HandoverPreparationInformation
               as-Config
                  <further details not shown>
HANDOVER REQUEST (from MME to target eNB)
   Source to Target Transparent Container
      Source eNB to target eNB Transparent Container
         RRC Container
            HandoverPreparationInformation
               as-Config
                  <further details not shown>

A UE may terminate communications occurring not only in protocol layers associated with the RAN and CN (e.g. EPC), but also occurring in higher protocol layers, which may be necessary for end to end communication between an application running on the UE and a remote peer application such as running on another entity/device or a server connected to the public internet. The UE may have immediate access to knowledge of the degree of user interaction with the device, for example whether a keyboard of the device has been recently touched, the status of a screen or screen backlight, whether a touch screen has been recently touched, the status of other user input devices or devices responding to user input gestures, and/or whether the device is in a user's pocket or holster. The UE may also have visibility of the execution status of running applications, including the type of application, whether or not one or more applications are open, and whether the applications are running in the foreground/background or are stored in a suspended or hibernated state in memory. The protocol status of the running applications may also be known to the UE, including whether acknowledgements or replies from a peer entity are pending and whether further data exchange is expected, for example, within a given time period. The UE may have knowledge of an application label or identifier. The UE may also have knowledge of additional factors that may be relevant to the radio communication such as a mobility condition of the UE, for example a speed of motion or a recent, current, or expected number of cell changes per unit of time, and/or information concerning radio channel conditions.

Conversely, the eNB may have visibility of only certain network layers including the physical layer, MAC layer, RLC layer, RRC and PDCP layer. The eNB may not have visibility of higher layer protocols, such as TCP/IP, or of application status as these may be terminated by a remote peer application server or device. The eNB may also not have visibility of the degree or nature of user interaction with the UE.

Because the UE may have more information than an eNB, the UE may be in a better position to suggest to the network when the UE's power consumption reduction should be prioritized over latency, Quality of Service, or Quality of Experience requirements of the radio communication. For LTE, it was agreed, at 3GPP RAN2 meeting #78, that a UE may indicate a preference for a power-optimized configuration via the transmission of a one bit indication. The timing and manner of the UE's transmission of the indication may be based on a UE's implementation and may take into account additional information known to the UE. The UE's assistance signaling for a power-optimized configuration is referred to herein as Power Preference Indication (PPI). The UE's decision to transmit one or more forms of PPI information can be made at a higher layer, such as by an application manager, an operating system controller, or a manager function, at the NAS (non-access stratum) layer, or at an AS (access stratum) layer, such as the RRC, MAC, or physical layer. The decision to transmit may be made using inputs from user plane entities, from device input/output functions, from radio receiver or signal processing functions, and/or from applications. Based on the received PPI signaling from the UE, and possibly in conjunction with other factors known to the eNB, the network may reconfigure the UE to provide a more power optimal RRC connected mode configuration. The RRC connected mode configuration may comprise a normal type configuration and/or a power-optimized type configuration. Additionally or alternatively, the network may choose to send the UE to an idle mode.

A Policy Charging and Rules Function (PCRF) located within the core network may configure one or more nodes along the communication path between the UE and the PGW (e.g. an eNB) such that the handling of data packets on a particular bearer conforms to the desired end to end QoS. A QoS Class Index (QCI) label is used to reference a set of associated QoS-related parameters, such as delay or packet loss rate. More than one bearer may be configured for a particular UE and these bearer(s) may be associated with different QoS requirements and hence with different QCI labels.

In general, the normal configuration may ensure that QoS requirements corresponding to the QoS Class Index (QCI) of the established Radio Access Bearers (RABs) are met and that these requirements take precedence over UE power savings. Thus, at the time of call setup, the eNB may determine DRX settings, inactivity timers, etc. according to the QCI of the established RABs. A power-optimized configuration, as could be applied in a system supporting UE assistance information, may constitute one or more power saving features. In power-optimized configuration, the UE power consumption reduction may receive a high priority, which may result in one or more of the QCI requirements of the established RABs, such as latency, not being met.

Unlike LTE, UTRAN may have four connected mode RRC sub-states in addition to an RRC Idle mode. Different connected mode UTRAN states may result in a different level of UE power consumption and QoS. Table 9 compares UE power consumption and mobility aspects in various UTRAN RRC states/sub-states:

TABLE 9

UTRAN RRC States

| RRC State | User plane data Tx/Rx | | UE power consumption aspects | Mobility aspects |
| --- | --- | --- | --- | --- |
| | uplink | downlink | | |
| Cell Dedicated Channel (CELL_DCH) | Dedicated physical channel available | Dedicated physical channel available | High power consumption due to continuous Rx and Tx (some power savings may be possible using the CPC feature). | Network controlled mobility |
| Cell Forward Access Channel (CELL_FACH) | RACH can be used | UE monitors a FACH channel | Medium power consumption. Power consumption can be reduced by using DRX for FACH monitoring | UE controlled mobility. Network knows the UE location at cell level |
| Cell Paging Channel (CELL_PCH) | No uplink | UE uses DRX to monitor paging channel (PCH) via an indication on the PICH | Low UE power consumption possible depending on the paging DRX cycle for the PICH channel | UE controlled mobility Network knows the UE location at cell level |
| URA Paging Channel (URA_PCH) | No uplink | UE uses DRX to monitor paging channel (PCH) via an indication on the PICH | Low UE power consumption possible depending on the paging DRX cycle for the PICH channel | UE controlled mobility Network knows the UE location at URA level |
| Idle Mode | No uplink | No downlink | Low UE power consumption | UE controlled mobility. |

Notes:
CPC refers to the "Continuous Packet Connectivity" feature in UTRAN
URA refers to "UTRAN Registration Area" which may comprise a group of cells Different connected mode RRC states in UTRAN may offer different degrees of UE power consumption. Transitions from one RRC state to an RRC state with higher power consumption (e.g. in the upwards direction of table 8) may be the result of UE or network-initiated service requests, or may be the result of the network detecting increases in the volume of data to be transferred and/or a need for higher data rates.

Transitions to RRC states with lower power consumption (e.g. in the downwards direction of Table 9) may be controlled by the network based on network data-inactivity timers. The network may also decide to perform such transitions based on input from the UE. For example, in 3GPP Release 8, upon determining that there is no further user plane data expected for a prolonged period the UE may send an RRC message Signaling Connection Release Indication (SCRI) with a cause value set to UE Requested PS Data Session End. Upon receiving such a RRC message from a UE, an entity within the network (e.g. an RNC within the UTRAN) may decide to move the UE to another more battery efficient RRC state. However, the network is free to take whatever action it deems appropriate, or to take no action at all. The UE may not be informed as to whether a subsequent network procedure to change the UE's RRC state is the result of a previous SCRI transmission by the UE or not.

Excessively frequent transmissions of SCRI by the UE may be controlled by a prohibit timer. The prohibit timer (e.g. T323) may be started whenever a SCRI is transmitted by the UE. The UE may be prevented from transmitting further SCRI messages while the timer is running. When the UE is in the CELL_PCH or the URA_PCH state, and when the paging DRX cycle is configured to be the same as, or longer than, the idle mode paging cycle, the number of SCRI message transmissions from cell_PCH or URA_PCH (e.g. as recorded by a counter V316) may be restricted to 1. In all other cases, the total number of SCRI transmissions may not be restricted.

A fast dormancy request may be transmitted from a UE to a network (eNB) within an LTE system. The fast dormancy request may be transmitted by a UE via the MAC layer or via RRC signaling. The network may respond in various ways, for example by releasing the RRC connection or by releasing or disabling certain uplink transmission resources (e.g. via a reconfiguration message sent by the network).

As discussed above, UE assistance signaling on uplink may be used to enable the network to make better decisions in moving the UE between a normal configuration and a power-optimized configuration, for example by configuring different DRX settings during connected mode, or moving the UE to idle mode based on network settings. However, UE assistance signaling may come at the expense of additional signaling in the uplink by the UE and appropriate control of these transmissions may be required. Transitions between different connected mode configurations may also incur additional signaling in the downlink.

The UE assistance signaling feature may require only that new uplink signaling is needed in order to convey the UE's preference for a power-optimized configuration to the network. Under this assumption, any network response to the UE assistance information may reuse existing signaling mechanisms on downlink to reconfigure the UE. In such a case, the UE may not be able to differentiate between a reconfiguration sent in response to previously sent assistance information on uplink and any other normal or on-going reconfiguration. In particular, the UE may be unaware which configuration state the UE is presently in (e.g. normal configuration or power-optimized configuration), which may result in certain drawbacks.

For example, the UE may not be able to unambiguously understand whether or not its PPI request has been respected by the network. Hence the UE may not be able to adjust its behaviors regarding subsequent transmission of the UE assistance information. Also, the UE may be unable employ differentiated control mechanisms to restrict or prohibit transmission of the assistance information that are specifically tailored to each state. Additionally, the meaning of the one bit UE assistance indication may be limited to prefer power saving or do not prefer power saving. While indication may enable a transition between two connected mode configurations (e.g. normal configuration or power-optimized configuration), the indication may not convey additional information which may be of use to the network in determining whether a transition from connected to idle is appropriate (e.g. regarding whether or not on-going user plane data is likely). In addition, UE assistance signaling may be a new feature and, as such, it may be advantageous for both the network and the UE to be aware of the support of this feature by the other entity. Efficient methods of implementing these changes are not defined in the 3GPP standard, nor are procedures associated with efficient use of the UE assistance information/power-optimized configurations during times of mobility between cells of the same Radio Access Technology (RAT), or during mobility between different RATs. These issues are further discussed below.

The UE preference for a power-optimized configuration may be signaled using one bit of information. The network may choose to act as per the UE preference and reconfigure the UE with a more power-optimized configuration or send the UE to idle mode based on network policy. Alternatively, the network may ignore the UE preference signaling for other reasons, such as other DRX configurations are not supported by the scheduler or idle mode is not suitable as the network has more data to send to the UE etc. In these scenarios, the UE may attempt to signal a preference multiple times to the network to attempt to ensure that its preference is respected. This may generate additional signaling traffic in uplink which may be undesirable. Alternatively, the network may perform on-going reconfigurations of the UE that are not in-fact associated with transition to or from a power-optimized state, and these reconfigurations may be misinterpreted as transitions to/from a power-optimized state by the UE and/or as responses to previously-sent UE assistance information. Additionally, even if the network respects the UE preference and moves the UE into what the network considers to be a power-optimized configuration, the configuration may not be sufficient to meet the UE's needs, which may result in the UE continuing to send the PPI information requesting further power savings. The UE preference may also change frequently thus generating more signaling on the air interface. Excessive signaling load may be undesirable and mechanisms may be required to control the transmission of PPI information by the UE. Optimizing power consumption for the UE may also involve reconfiguring the DRX, reconfiguring the uplink L1 control channel configuration in connected mode, and/or sending the UE to idle mode. Such reconfigurations by the network may involve additional RRC signaling in the downlink. Therefore, each time UE assistance signaling is received by the network, the network response, if one is taken, may result in further signaling load in the downlink. Excessive downlink signaling may be undesirable.

The UE may also be aware of application behavior and may be in a position to recommend when the use of idle mode is optimal for power saving purposes. However, the use of one bit PPI signaling as agreed by RAN2 for LTE may not be sufficient to unambiguously distinguish between: (1) the UE's preference to remain connected with a power-optimized configuration, and (2) the UE's preference to go to idle mode which may be more appropriate if no further data exchange is expected by the UE.

In response to received PPI information from the UE, one network strategy may be to send the UE directly to idle mode, from the normal configuration, instead of keeping the UE connected with a power-optimized configuration. However, in this case the cost could result in: (1) additional RRC connection establishment signaling could result if the UE needs to return to connected mode shortly after moving to idle in order to convey user plane data, and (2) additional power consumption for the UE may be incurred when re-establishing the RRC connection as the exchange of the associated signaling messages may result in additional power consumption. Therefore, with only a one bit PPI, the current agreements in RAN2 may not allow the UE to indicate to the network that use of the idle mode would be preferred. Additionally, the network may wish to implement more than one power-optimized state in connected mode, for example there may be a normal configuration, and a plurality of power-optimized configurations of differing degree. Methods to handle this scenario are not currently defined. While the PPI information sent by the UE may be limited to a request for one of two configurations or states (e.g. normal or power-optimized), using this information to transition between more than two connected mode configurations may be desirable to in some implementations to enable additional flexibility.

The UE assistance information signaling may be a new feature and as such both the network and UE may need to make the other entity aware of the support of the feature before the feature can be used. While there are a number of strategies to signal network and UE capabilities to each other, efficient methods of signaling the capabilities may be required and are currently absent.

While the use of UE assistance information to support a power-optimized connected mode state/configuration within LTE may introduce significant benefits, the benefits may only be realized throughout the network if the UE assistance information is exploited during handover to other cells of the same RAT (e.g. LTE), or to cells of a different radio technology (e.g. UMTS, 2G, WiFi etc. . . . ). Mechanisms to utilize this information during intra- and inter-RAT handover may not be currently provided.

Disclosed herein is a system, method, and/or apparatus to determine the current power configuration state of a UE. In an implementation, the eNB may transmit a message to the UE, where the message comprises a Normal/Power-Optimized (N/P) indicator (e.g. a flag) to the UE. In an alternative implementation, the UE may assume an implicit grant of the PPI request and may move to a power-optimized configuration and/or a normal configuration unless the PPI request is disallowed within a given timeframe. In either implementation, once the UE is aware of its current state (e.g. normal configuration or power-optimized configuration), the UE may use the state information to determine an appropriate set of response behaviors. In an implementation, a UE in power-optimized configuration may employ inhibit/prohibit mechanisms (e.g. configure prohibit counters, timers, or other parameters) to prevent the UE from sending additional PPI requests to the eNB for a predetermined amount of time. In another implementation, a UE in power-optimized configuration may send a second PPI message to the eNB, which may be interpreted as a request to enter an idle mode. In another implementation, a UE that receives an N/P indicator from an eNB may determine that the network supports PPI signaling. In various implementations, an N/P indicator may be transmitted as part of an RRCConnectionSetup message, an RRCConnectionReconfiguration Message, an RRCReconfiguration message, and/or as a standalone indicator included in another RRC or MAC level message. In a further implementation, an N/P indicator may be included in an information element (IE) and transmitted from the UE to the eNB or from the eNB to the UE using RRC level signaling or MAC level signaling. In yet another implementation, an eNB may transmit the N/P indicator for a UE to a second eNB during a handover procedure. The second eNB may use the current state information to allow the UE to remain in a power-optimized or idle mode or quickly transition the UE from a normal configuration to a power-optimized configuration. Depending on the implementation, the eNB may be configured to perform handovers between a LTE network and a UTRAN network and vice versa and convert from LTE power-optimized states to UTRAN power-optimized states. In an implementation, the UE may also use the knowledge of its current state to determine whether immediately performing a RRC connection reestablishment in case of a radio link failure is desirable.

Many of the issues listed above may be alleviated by providing an explicit indication from the network to the UE regarding whether the current configuration should be considered as a normal configuration (N) or a power-optimized configuration (P). An explicit indication may be provided to the UE by using an information element signaled to the UE in the downlink by the eNB. For example, such an indication may take the form of an N/P flag, which may also be referred to as an N/P indication.

An N/P indication equal to normal may indicate that the UE should employ a first set of behaviors commensurate with being in a normal configuration. If configuration information is also transmitted along with the N/P indication, the UE may treat this configuration information as pertinent to a normal configuration. If configuration information is not transmitted along with the N/P indication, the UE may retrieve and apply previously-stored configuration information related to a normal configuration.

An N/P indication equal to power-optimized may indicates that the UE should employ a second set of behaviors commensurate with being in a power-optimized configuration. If configuration information is also transmitted along with the N/P indication, the UE may treat this configuration information as pertinent to a power-optimized configuration. If configuration information is not transmitted along with the N/P indication, the UE may retrieve and apply previously-stored configuration information related to a power-optimized configuration.

Figure 10:
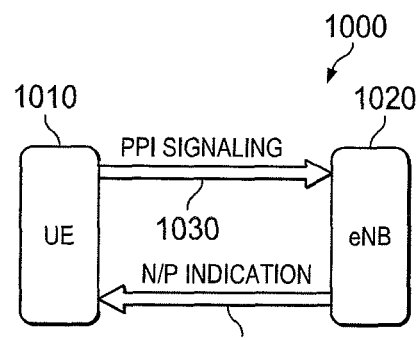
FIG. 10 illustrates an implementation of a system for PPI signaling between a UE and an eNB.

FIG. 10 illustrates an implementation of a system 1000 for PPI signaling 1030 between a UE 1010 and an eNB 1020. As discussed above, the UE 1010 may transmit PPI signaling 1030 to the eNB 1020 requesting a transition between a normal configuration and a power-optimized configuration. The eNB 1020 may send an N/P indication 1040 to the UE 1010 to indicate that the UE 1010 should transition/remain in a normal configuration/state or a power-optimized configuration/state. The N/P indication 1040 may be accompanied by related configuration/reconfiguration information.

In a first implementation, the PPI information 1030 may comprise a true/false indication, indicative of whether the UE 1010 prefers a power-optimized configuration or not, and the N/P indication 1040 may comprise a binary value corresponding to N or P respectively. In a second implementation, the presence of the PPI information 1030 may convey a toggle request to indicate the UE's 1010 desire to switch state, from N to P or P to N dependent on the current state. The eNB 1020 may respond with an N/P indication 1040 to signal an allowance of the toggle. In this case, the N/P indication 1040 may comprise an explicit indication of N or P, or may simply comprise a toggle ACK or toggle confirm message. So long as the UE 1010 and eNB 1020 have a common understanding regarding the initial state (N or P), and in the absence of communication errors, the UE 1010 and eNB 1020 may remain synchronized in their mutual understanding of the current state. In another implementation, the UE 1010 may be allowed to assume an implicit grant of its PPI request signaling 1030. The UE 1010 may move to its requested N or P configuration unless the eNB 1020 responds with an N/P indication 1040 or similar message to disallow the transition, for example within a predefined time window. Assuming that the network follows the UE's 1010 PPI request 1030 most of the time, use of such a scheme may reduce downlink signaling overheads.

The network, via the eNB 1020, may be generally free to transmit N/P indications 1040 at times of the network's choosing. The N/P indication 1040 may be sent in response to PPI information 1030 received from the UE 1010. The N/P indication 1040 may also be the result of decisions taken autonomously by the eNB 1020 or network, independent of the UE's PPI request 1030, based on other information available to the eNB 1020.

Based on received N/P indications 1040, the UE 1010 can be made aware of whether it is currently in a normal configuration or a power-optimized configuration. The UE's 1010 knowledge of its current configuration may be used in defining rules or behaviors for the UE 1010 to follow. These rules or procedures may govern various implementations of the system 1000 operation including, but not limited to: (1) procedures governing how the UE assistance information, such as PPI 1030, is sent by the UE 1010, (2) governing when the UE 1010 assistance information is sent by the UE 1010, (3) governing what information is conveyed by the UE 1030 assistance information and/or what triggers its transmission, (4) governing control of the frequency, timing or number of times that the UE 1010 assistance information may be retransmitted by the UE 1010, (5) governing whether the UE 1010 stores or overwrites a received configuration in a region of memory assigned to a normal or a power-optimized configuration, and/or (6) governing switching by the UE 1010 between configurations, that may have been previously received or stored, or between behaviors applicable to normal and power-optimized modes of operation.

In particular, the UE 1010 may use the received N/P indication 1040 to unambiguously know whether the UE 1010 is currently in a normal configuration or a power-optimized configuration. This unambiguous knowledge at the UE 1010 about the UE's 1010 current configuration can be used in numerous ways. The UE 1010 may for example use the information in order to employ PPI inhibit/prohibit mechanisms, such as configuring prohibit counters, timers, or other parameters, that are tailored for either the normal or power-optimized state, respectively. The UE 1010 may also use the information in order to change the meaning conveyed by a PPI request 1030 dependent on the current configuration (e.g. normal or power-optimized). For example, a UE 1010 may send a further PPI 1030 equals true indication from an already power-optimized configuration in order to convey to the network that further user-plane data activity is not expected for a prolonged period and use of idle mode may be appropriate. This enables UE 1010 assisted transitions to idle mode and reduces the possibility of subsequent/frequent reconnections. The UE 1010 may also use the information to determine that the network supports the UE 1010 assistance information feature and enable the transmission of subsequent PPI information 1030 accordingly, for example without the need for other specific network capability or feature enablement signaling. The UE 1010 may also use the information to write a received configuration to a portion of memory assigned for normal or power-optimized usage. The UE 1010 may also use the information to transition between configurations for normal and power-optimized that have been previously stored without the need to receive a full reconfiguration comprising all associated parameters for each transition. The UE 1010 may also use the information to control transmission on one or more uplink resources, such as uplink control channel resources, release uplink resources, adjust a timing alignment timer, or force expiry of a timing alignment timer.

The UE assistance information feature may rely upon both the network and the UE being aware of the current configuration of the UE, for example, whether the UE is currently in normal configuration or in power-optimized configuration. During handover, the source cell may transfer an indication as to whether the UE is in normal configuration or in power-optimized configuration to the target cell, if the target cell also supports the feature. Subsequently, the target cell may signal a new connected mode configuration to the UE along with the N/P indication included in the RRC connection reconfiguration message to signal new normal or power optimized configuration applicable after cell change. While reconfiguring the UE's RRC connected mode configuration, the target cell may take into account the current configuration of the UE in the source cell as indicated by the N/P indication. For instance, the target cell may configure a UE that is power-optimized in the source cell with a new power-optimized configuration suitable for the target cell. The UE may need to clear any stored configurations after handover. Similar principles may also apply in case of inter-RAT mobility. Further, PPI signaling and N/P indications may also play a role in improving handling of radio link failures.

The UE's knowledge of its current configuration, for example normal/power-optimized, may be obtained from an N/P indication and used to reduce uplink signaling by adjusting PPI inhibit, prohibit, and/or control mechanisms. The prohibit mechanisms and/or UE behaviors regarding transmission of PPI may be different in different configurations. For example, prohibit mechanisms may employ timers and counters to control or limit the frequency of message transmission. For example, a prohibit timer may be initialized to a predefined value and started whenever a particular message is sent. While the timer is running, further transmission of the message is prohibited. A maximum count value may also be employed, wherein a number of transmitted messages is compared to the maximum count value, and, based on the comparison, the transmission of further messages is either allowed or disallowed. Other parameters, timers or counters may be used as part of an overall message inhibit, prohibit, and/or control mechanism. In some implementations, the UEs transmission of PPI messages may be controlled by different methods that are specifically tailored for either the normal configuration or power-optimized configuration, respectively. For example, prohibiting PPI signaling messages that request a transition from power-optimized to normal may degrade a user's quality of experience more than prohibiting the reverse transition. Therefore, in some implementations, the UE may employ a lesser degree of control over PPI transmissions when in the power-optimized configuration by providing lower prohibit timer values or higher maximum count values than the normal configuration prohibit timer/maximum count values. In some implementations, the UE may employ a first set of PPI prohibit control parameters, such as timers, counters, and the like, in the case that the UE is currently configured for a normal mode of operation, and a second set of PPI prohibit control parameters, such as timers, counters, and the like, in the case that the UE is currently configured for a power-optimized mode of operation. These parameters may be predefined within an industry standard, or may be configured by the network in order to achieve the desired UE behavior. Table 10 illustrates an example of power configuration specific PPI prohibit control parameters.

TABLE 10

Adjustment of Prohibit Control Parameters as a function of the mode of operation

| Configuration | |
|---|---|
| Normal | Power-Optimized |
| PPI Prohibit Control Parameter set "A" | PPI Prohibit Control Parameter set "B" |

Additionally and/or alternatively, the network may explicitly signal specific prohibit control parameters or a prohibit control parameter set for the UE to apply. Such explicitly signaled prohibit control parameters and/or sets may be independent of an N/P indication and/or independent of the current power configuration information (e.g. normal/power-optimized). Events controlling the prohibit mechanism, such as events causing prohibit timers/counters to be initialized/started and/or events causing prohibit timers/counters to be set, reset, incremented, or decremented), may include: (1) transmission of a PPI message, (2) transmission of a PPI message with particular content, such as conveying PPI equals true or PPI equals false, (3) receipt of a network acknowledgement of a PPI message transmission, such as an RRC confirm and/or complete message, an RLC ACK, or a HARQ ACK, and (4) receipt of a response from the network to a PPI request, such as a reconfiguration or an N/P indication. The foregoing list of prohibit mechanism controlling events is provided for purposes of clarity and should not be considered limiting. Those skilled in the art will understand that prohibit mechanisms may be effected by a wide variety of events which are within the scope of this disclosure, Some illustrative examples of prohibit timers and counters are provided in Table 11.

TABLE 11

Example PPI prohibit control parameters as a function of current configuration

| | | Configuration | |
|---|---|---|---|
| Parameter | Description | Normal | Power-optimized |
| Max PPI count | Further PPI transmissions may not be allowed in either Normal or Power-optimized configuration after this many transmissions of the same PPI information by the UE from within a given configuration. If the network policy is to prevent the UE from repeating PPI requests within the same configuration, the network may set Max PPI count to 1 for that state. | N_PPI_max_N | N_PPI_max_P |
| PPI Prohibit timer may be applicable after sending a PPI equals true indication if Max PPI count > 1 | Timer may be initialized with this value after every PPI equals true transmission. A transmission of a second PPI equals true message may not be allowed while this timer is running. A UE repeatedly indicating PPI equals true while in normal or power-optimized mode may increase unnecessary uplink signaling. A large prohibit timer value may be used in both modes. | (e.g. in units of 1 ms sub-frames) Reasonably large value | (e.g. in units of 1 ms sub-frames) Reasonably large value |
| PPI Prohibit timer may be applicable after sending a PPI equals false indication if Max PPI count > 1 | Timer may be initialized with this value after every PPI equals false transmission. A transmission of another PPI equals false message may not be allowed while this timer is running. A UE indicating PPI equals false while already in the normal configuration may not be needed. Such signaling may be prohibited by a large or infinite timer value. The transition from power-optimized to normal configuration may be considered important for user experience and may be prioritized by setting a small prohibit timer value. | N/A or Infinite | 0 or a small value |

TABLE 11-continued

Example PPI prohibit control parameters as a function of current configuration

| | | Configuration | |
|---|---|---|---|
| Parameter | Description | Normal | Power-optimized |
| Configuration toggle timer | Timer may be started every time the UE enters a given configuration. Whilst the timer is running, transmission of PPI may be prohibited. If the UE has recently entered the normal mode from the power-optimized mode (as per its PPI request), the UE may not be allowed to quickly send another PPI request to go back to power-optimized mode. This case of frequent configuration toggling may be prevented by the network via setting a large value for the configuration toggle timer in normal configuration. Whilst in a power-optimized configuration, the UE may be allowed to quickly move back to normal if the user resumes interaction with the device. Hence power-optimized timer may be set to a small value by the network to prioritize user experience. | A large value may be preferred | A small value may be preferred |

As can be seen from the above table, the network may choose various parameters to be applicable in various configurations. By varying the values of the timers/counters in the different configurations, the network may prioritize between power optimization at the UE and the user experience. Such PPI prohibit control parameters and/or parameter sets may be signaled to the UE during call setup or during a call. The parameters may be sent along with a corresponding configuration of other parameters such as those related to DRX, UL control channel resources, and/or TAT. The parameters may also be sent independently of other configuration parameters.

The various PPI prohibit control parameters may be stored in and transmitted via an IE called PPI-prohibit-Config. This IE may be included within various RRC messages and/or IEs that are broadcast within system information or signaled in dedicated fashion to a particular UE. An example of such signaling is shown in table 12 below for the case of dedicated UE signaling. In this example, the PPI-prohibit-Config IE is included along with an N/P indication in a NormalOrPowerOptConfig IE to indicate which configuration the parameters apply to (e.g. normal or power-optimized). The example also shows the case in which the PPI-prohibit-Config IE is included along with configuration data such as data relating to DRX parameters.

TABLE 12

Signaling of PPI prohibit control parameters within a PPI-prohibit-Config IE

[RRCConnectionSetup] OR [RRCConnectionReconfiguration] OR [RRCConnectionReestablishment]
    RadioResourceConfigDedicated
        NormalOrPowerOptConfig
            NormalOrPowerOpt
        PPI-prohibit-Config
            Max PPI Count
            PPI Prohibit Timer
            Configuration Toggle Timer

TABLE 12-continued

Signaling of PPI prohibit control parameters within a PPI-prohibit-Config IE mac-MainConfig
        drx-Config
            onDurationTimer
            drx-InactivityTimer
            drx-RetransmissionTimer
            longDRX-CycleStartOffset
            shortDRX
                shortDRX-Cycle
                drxShortCycleTimer Alternatively, the PPI-prohibit-Config IE may contain two values for each parameter, one applicable for the normal configuration and one applicable for the power-optimized configuration. In this case, the IE may not be sent along with the NormalOrPowerOptConfig IE. If a parameter value is intended to be the same in both configurations, only one value may be sent for that parameter. The PPI prohibit control parameters may also be included with other pre-existing IEs.

The UE's knowledge of its current configuration, for example normal/power-optimized, may be obtained from an N/P indication and used to for efficient transitions from RRC connected mode to idle mode. The current RAN2 agreements regarding the PPI signaling allow a UE to toggle between normal and power-optimized connected mode configurations, but do not allow the UE to indicate to the network that use of the idle mode would be preferred.

Figure 11:
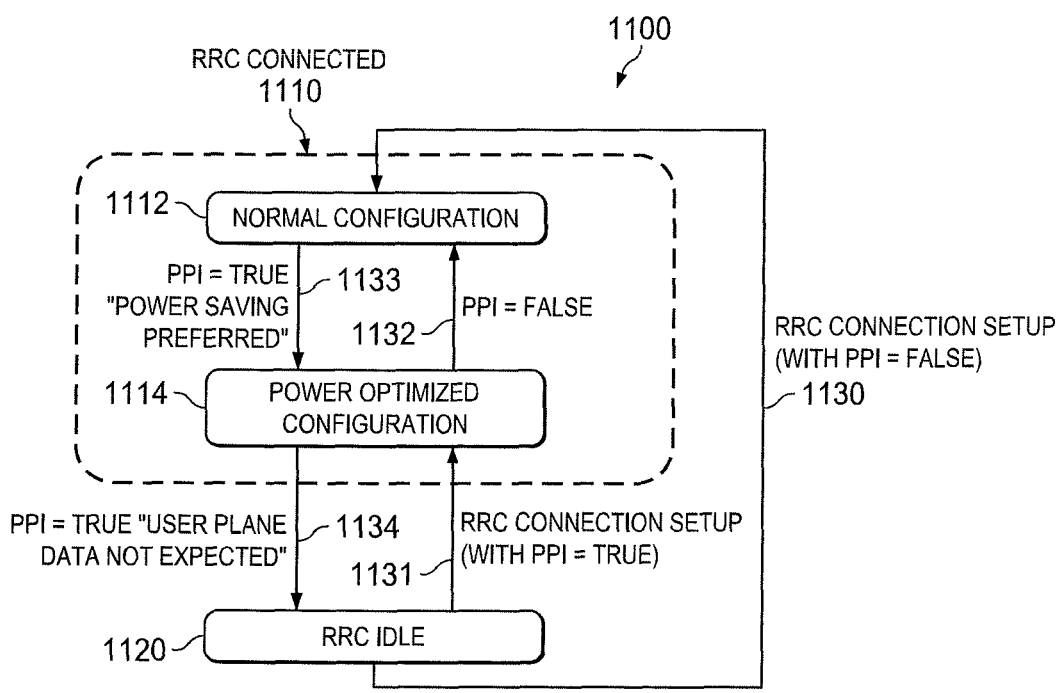
FIG. 11 illustrates an implementation of a method of using PPI signaling in transitioning a UE between an RRC connected mode and an idle mode.

FIG. 11 illustrates an implementation of a method 1100 of using PPI signaling in transitioning a UE between an RRC connected mode 1110 and an idle mode 1120. The RRC connected mode 1110 may be substantially similar to RRC connected mode 210 and may comprise a normal configuration 1112 and a power-optimized configuration 1114. RRC idle mode 1120 may be substantially similar to idle mode 220. Depending on the implementation, a normal configuration 1112 may employ a continuous connection 211, while a power-optimized configuration 1114 may employ short DRX 212 and/or a long DRX 213. A UE may transition 1130-1134 between idle mode 1120, power-optimized configuration 1114, and normal configuration 1112 as shown in FIG. 11.

Due to the relatively high signaling overheads and power consumption costs of transitioning between idle mode 1120 and connected mode 1110, a UE may enter idle mode 1120 when there is some degree of confidence that there will not be a need to exchange further user plane data for some time, as idle mode 1120 may not support user plane data transactions. If the UE can effectively predict and/or signal the UE's future user plane data exchange needs, the UE's usage of system resources may be minimized and the risk to the network of subsequent or frequent transitions to RRC connected 1110 mode may be reduced.

PPI signaling may be used to transition 1132-1133 a UE between the normal configuration 1112 and the power-optimized configuration 1114. As discussed above, a PPI equals false signal sent from a UE in power-optimized configuration 1114 may be used by the network to transition 1132 the UE to normal configuration. Likewise, a PPI equals true signal sent from a UE in normal configuration 1110 may be used by the network to transition 1133 the UE to power-optimized configuration 1114. The same PPI signaling that is used to transition 1132-1133 from the normal configuration 1112 to the power-optimized configuration 1114 may be used to indicate to the network that idle mode 1120 is suitable. Such signaling may require that the UE is made aware that the UE is currently in a power-optimized configuration 1114. The meaning of a PPI equals true message from a UE within the power-optimized configuration 1114 may be adjusted to signal to the network that the UE does not expect further user-plane data for a prolonged period instead of expressing a mere preference for further power saving. This request to transition 1134 to idle mode 1120 may be sent by the UE, for example, if all running applications on the UE have been closed, or if all running applications have completed their data exchanges and are expected to remain dormant for some time. The trigger for a UE to send a PPI equals true message may be adjusted as a function of the current configuration 1112/1114 as shown in the example of table 13. Additional or other criteria may also be taken into account by the UE when determining whether or not to send PPI equals true from a power-optimized configuration 1114.

TABLE 13

Adjustment of PPI triggering as a function of the configuration

| Configuration | |
| --- | --- |
| Normal 1112 | Power-optimized 1114 |
| PPI = true may be triggered based on the UE's desire for power saving | PPI = true may be triggered based on the UE's determination that no further user plane data is expected for some time (e.g. idle mode 1120 is appropriate). |
| PPI = false message may not be supported or triggered based on another event | PPI = false may be triggered based on the UE's preference to return to the normal configuration 1112 |

PPI information may be used to transition not only between normal 1112 and power-optimized configurations 1114 within the connected mode 1110, but also between a power-optimized configuration 1114 in connected mode 1110 and idle mode 1120. When in the normal configuration 1112, a message containing PPI equals true may be sent by the UE in order to inform the network of its preference for power saving. Once this request has been granted by the network, via a suitable reconfiguration of the UE, the UE may transition 1133 to power-optimized configuration 1114. Once in power-optimized configuration 1114, the UE may send a further message containing PPI equals true, but this time the message may indicate that use of idle mode 1120 is appropriate and the network may release the UE's RRC connection, causing the UE to transition 1134 to idle mode 1120.

If such signaling is not supported, the network may instead run a data inactivity timer while the UE is in the power-optimized configuration 1114 and only move the UE to idle 1120 upon expiration of the timer. The length of this timer may be relatively long. A UE in Idle mode 1120 may not create handover signaling loads and may consume very little or no system resources during times of data inactivity. Therefore, moving an inactive UE to idle 1120 without waiting for an inactivity timer to expire may minimize handover signaling overheads and the use of system resources.

When data activity resumes, the UE may be transitioned from idle 1120 to the connected mode 1110 via an RRC Connection Setup procedure. A PPI indication (e.g. true or false) may be included by the UE within one or more of the messages exchanged during the setup procedure, such as a RRCConnectionRequest or RRCConnectionSetupComplete, which may allow the network to configure the UE appropriately from the outset of the connection. For example, a PPI indication of true may allow the network to configure the UE to transition 1131 to the power-optimized configuration 1114, while a PPI indication of false may allow the network to configure the UE to transition 1130 to the normal configuration 1112. The PPI indication may also be used by the network to determine an action, such as whether or not to accept, reject or postpone the connection procedure.

Figure 12:
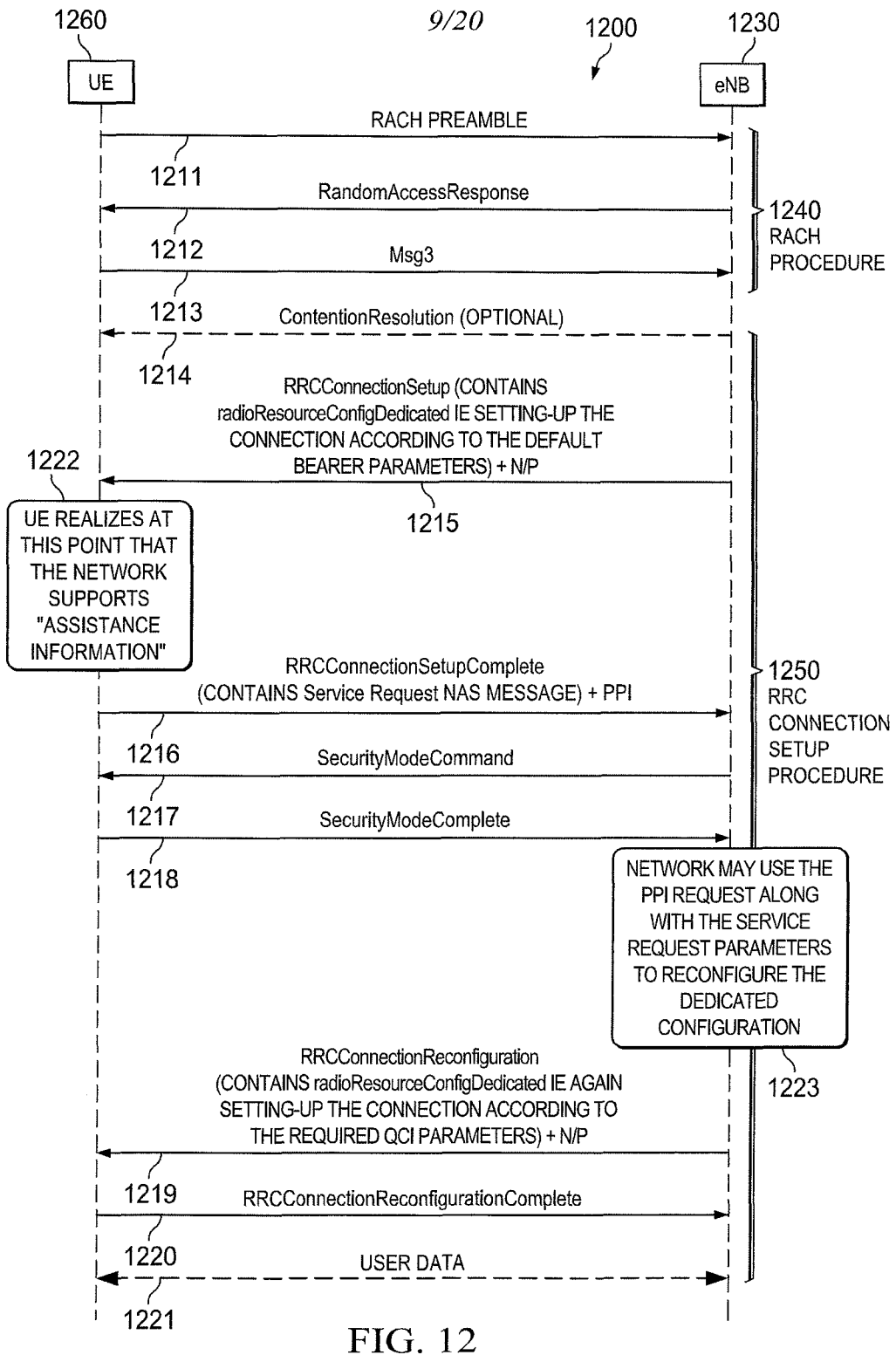
FIG. 12 illustrates an implementation of a RRC layer connection procedure comprising signaling of a networks ability to accept UE assistance information.

FIG. 12 illustrates an implementation of a RRC layer connection procedure 1200 comprising signaling of a network's ability to accept UE assistance information. PPI signaling to transition a UE 1260 between normal and a power-optimized configuration may not be supported on all devices. The UE 1260 and the network and/or eNB 1230 should support PPI signaling in order for such signaling to be fully functional. The UE 1260 may need to understand whether the eNB 1230 supports the feature in order to enable or disable the transmission of PPI signaling. The eNB 1230 may need to understand whether the UE 1260 supports the feature in order to enable, disable, and/or adjust network functionality, such as Radio Resource Management (RRM) and/or components involved in downlink signaling. The eNB 1230 may also wish to control whether or not a UE 1260 sends PPI signaling. For example the eNB 1230 may wish to enable or disable UE 1260 PPI signaling. This may be achieved with explicit enable/disable signaling to the UE 1260, for example, in system broadcast or dedicated signaling messages addressed solely to the UE 1260. However, if the eNB 1230 supports transmission of an N/P indication to provide the UE 1260 with knowledge of its current configuration, the knowledge PPI signaling compatibility may be used by the UE 1260 as a trigger to enable the transmission of PPI signaling.

A rule may be applied within the UE 1260 to enable or disable PPI signaling. The rule may for example be based on the principle that PPI signaling may be transmitted by the UE 1260 if at least one N/P indication has been received from the eNB 1230 in the current serving cell. The existence of an N/P indication in a downlink message may be understood by the UE 1260 as an indication of the eNB 1230, network, and/or network cell's support of PPI signaling.

Networks wishing to prevent the transmission of PPI signaling may do so by refraining from transmitting any N/P indications to the UE 1260. This approach avoids the need for additional or supplementary PPI enable/disable signaling or for the eNB 1230 to signal its capability/support of PPI signaling to the UE 1260. Networks wishing to enable PPI signaling may include an N/P indication, for example during an RRC connection setup procedure 1240 in an RRCConnectionSetup message or an RRCConnectionReconfiguration, to indicate its support of PPI signaling. The RRCConnectionReconfiguration including the N/P indication may also be sent outside of the RRC connection setup procedure 1240.

In terms of UE capability signaling, the UE 1260 may transmit an explicit indication of the UE's 1260 support for PPI signaling within a UE capability message such as a UECapabilityInformation message, which may be sent, for example, in response to a UECapabilityEnquiry message received from the eNB 1230. In addition or in the alternative, the UE 1260 may send a PPI indication during an RRC connection setup procedure 1240, for example in an RRCConnectionRequest or RRCConnectionSetupComplete, in order to convey its support for PPI signaling to the eNB 1230. The RRCConnectionSetupComplete including the PPI indication may also be sent outside of the RRC connection setup procedure 1240. This implementation avoids the need for additional UE 1260 capability signaling and provides an efficient implementation by reusing the existing PPI signaling for this purpose.

FIG. 12 comprises an example of UE 1260 and network/eNB 1230 capability exchange using an N/P indication on downlink and using PPI signaling on uplink to exchange network and UE capability support for PPI signaling. The RACH procedure 1240, the RRC Connection Setup procedure 1250, and steps 1211-1221 may be substantially similar to RACH procedure 440, the RRC Connection Setup procedure 450, and steps 411-421, respectively, except that the RRCConnectionSetup message of step 1215 may comprise an N/P indication, the RRCConnectionSetupComplete message of step 1216 may comprise a PPI indication, and the RRCConnectionReconfiguration message of step 1219 may comprise an N/P indication.

Following the RACH procedure 1240, in step 1215 the eNB 1230 may transmit the RRCConnectionSetup message containing an N/P indication to the UE 1260. The N/P indication may be included in a NormalOrPowerOptConfig IE and may, for example, be set to normal. Upon receipt of the N/P indication in step 1215, the UE realizes that the network supports assistance information signaling at step 1222. Receipt of the N/P indication from the eNB 1230 may enable the transmission of PPI by the UE 1260. As such, the UE 1260 may transmit a PPI message containing the UE's 1260 preference either within an uplink RRC message, such as the RRCConnectionSetupComplete message of step 1216, or within a MAC CE sent at a different or coincident time. Receipt of the PPI signaling may allow the eNB 1230 to understand that the UE 1260 supports PPI signaling. After the SecurityModeComplete message is sent in step 1218, the network may use the PPI request along with the service request parameters to reconfigure the dedicated configuration in step 1223. The network may then transmit the configuration to the UE 1260 in step 1219. An N/P indication may be sent along with the configuration, or may be sent separately, for example using either RRC or MAC layer signaling.

Alternative message sequences from the implementation shown in FIG. 12 may be possible, depending on which messages are extended to include the N/P indication and the PPI indication. Sequences are possible where the UE 1260 includes a first PPI indication to the eNB 1230, for example, in RRCConnectionSetupComplete, before the UE 1230 knows whether the network supports PPI signaling. On reception of this request, the network may know that the UE 1260 supports PPI signaling and the eNB 1230 may include an N/P indication in the RRCConnectionReconfiguration message. If the N/P indication is included then the UE 1260 knows that the eNB 1230 supports the feature and it is permitted to send further PPI requests while it is in this cell. If not included, the UE 1260 knows that network/eNB 1230 does not support PPI signaling or it is not permitted to send further PPI requests.

In addition, after a handover to another network cell (e.g. the target cell), it may be necessary for the UE 1260 and the second network cell to each determine whether the other supports PPI signaling. An RRCConnectionReconfiguration message that originates from the target cell and is sent to the UE 1260 via the source cell (e.g. eNB 1230) in order to trigger the handover may include the N/P indication. If the N/P indication is included, the UE 1260 then knows that the new serving cell may support PPI signaling and the UE 1260 is permitted to send further PPI requests while it is in the new cell. If the N/P indication is not included, then the UE 1260 knows that the new serving cell may not support PPI signaling and that the UE 1260 may not be permitted to send further PPI requests while on the new serving cell.

Figure 13:
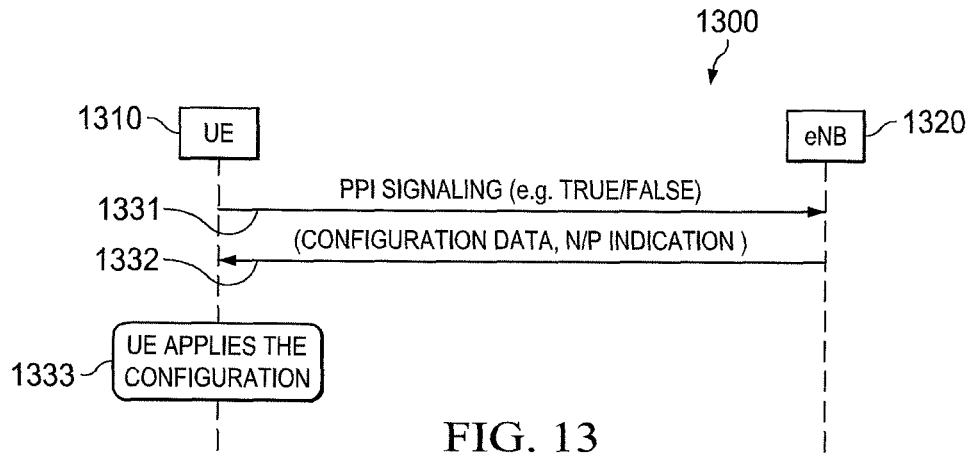
FIG. 13 illustrates an implementation of a UE configuration procedure.

FIG. 13 illustrates an implementation of a UE configuration procedure 1300. In step 1331, a UE 1310 may send a PPI indication to an eNB 1320. In step 1332, the eNB 1320 may send an N/P indication and related configuration data to the UE 1310. Upon receiving the N/P indication and the configuration data, in step 1333 the UE 1310 may apply the configuration data.

Specifically, an N/P indication may be sent in conjunction with configuration data or reconfiguration data that defines the specific configuration for the UE 1310 to apply. For example, the N/P indication may be sent by the eNB 1320 in step 1332 along with a message that either configures or re-configures the UE's 1332 connected mode configuration. Messages that may contain the N/P indication may or may not be restricted to a particular group or type of message, or to those carrying particular configuration data, such as DRX parameters, uplink control channel parameters, and the like. One example of when the N/P indication may be sent is during an RRC connection setup procedure, such as 450 or 1250, in which the N/P indication may be included within either an RRCConnectionSetup message or within an RRCConnectionReconfiguration Message. In another example, the N/P indication may also be sent at any time during RRC connected mode, for example via an RRCReconfiguration message in step 1332 based on the UE's latest PPI request in step 1331.

Figure 14:
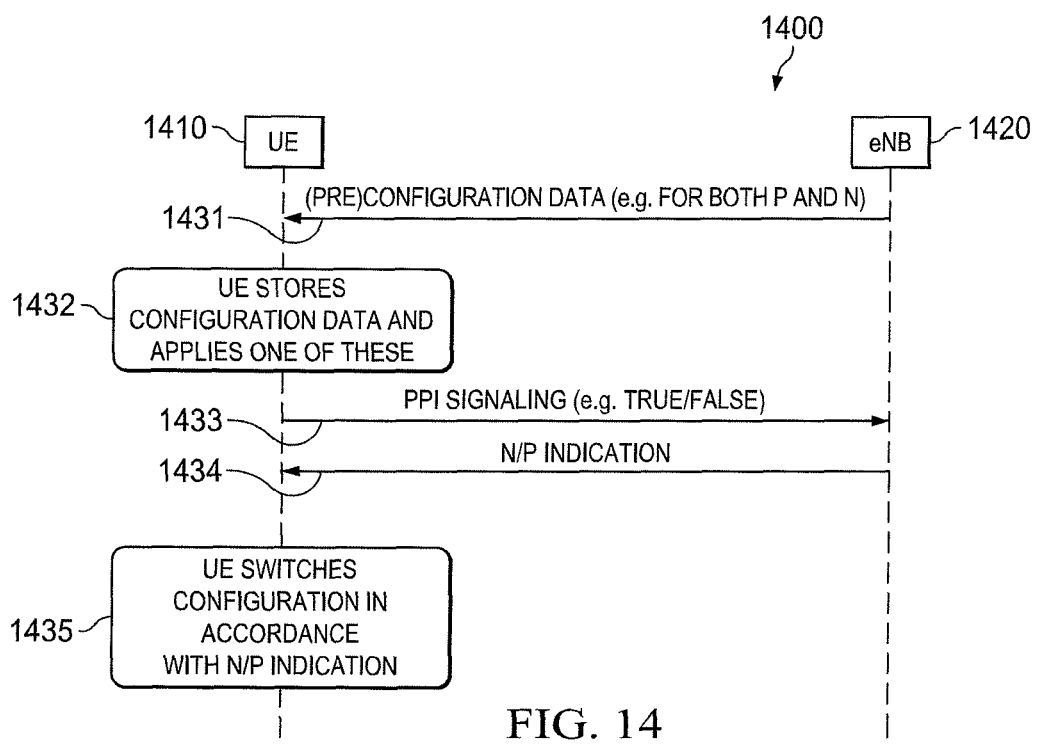
FIG. 14 illustrates an implementation of a procedure of performing an N/P configuration with subsequent power configuration switching.

FIG. 14 illustrates an implementation of a procedure 1400 of performing an N/P configuration with subsequent power configuration switching. An eNB 1420 may, in step 1431 transmit configuration data to a UE 1410. The UE 1410 may store the configuration data in step 1432. In step 1433 the UE 1410 may perform PPI signaling. In step 1434, the eNB 1420 may send an N/P indication to the UE 1410. In step

1435, the UE may switch configurations in accordance with the N/P indication of step 1434.

Specifically, in procedure 1400 an N/P indication may be sent as standalone data by the eNB 1420, for example the N/P indication may not be sent in conjunction with configuration/reconfiguration data that defines the configuration the UE 1410 should apply. To respond to the N/P indication, the UE 1410 should already be aware of the normal and/or power-optimized configuration data, which may have been previously sent to the UE 1410 and stored by the UE 1410 in memory. The N/P indication of step 1434 may be used by the UE 1410 to recall and apply a previously-stored configuration without the need for the full reconfiguration data to be signaled for each configuration change. The pre-configuration of normal and power-optimized configurations in step 1431 may occur either sequentially, for example the N and P configurations sent in 2 different messages, or simultaneously, for example both N and P configurations are sent in the same message. If the N and P configurations are sent in the same message, the UE 1410 may differentiate between N and P configurations via explicit N/P indications in each of the configuration or by implicit rules, for example based on how the configurations are arranged in the message, for example the first configuration may refer to N and the second configuration may refer to P, etc. In the case that N and P configurations are sent in the same message in step 1431, the configuration to be applied by the UE 1410 may be either signaled explicitly by the network in step 1434 or may be based on implicit rules. Following the pre-configuration of steps 1431-1432, switching between configurations based on an N/P indication from the eNB 1420 may be enabled in steps 1433-1435.

A stand-alone N/P indication may be transmitted in step 1434 via RRC signaling, for example within an RRCConnectionReconfiguration message, other RRC message, and/or via MAC level control signaling. The pre-configuration 1431-1432 steps may be achieved via RRC signaling using RRCConnectionReconfiguration messages.

Figure 15:
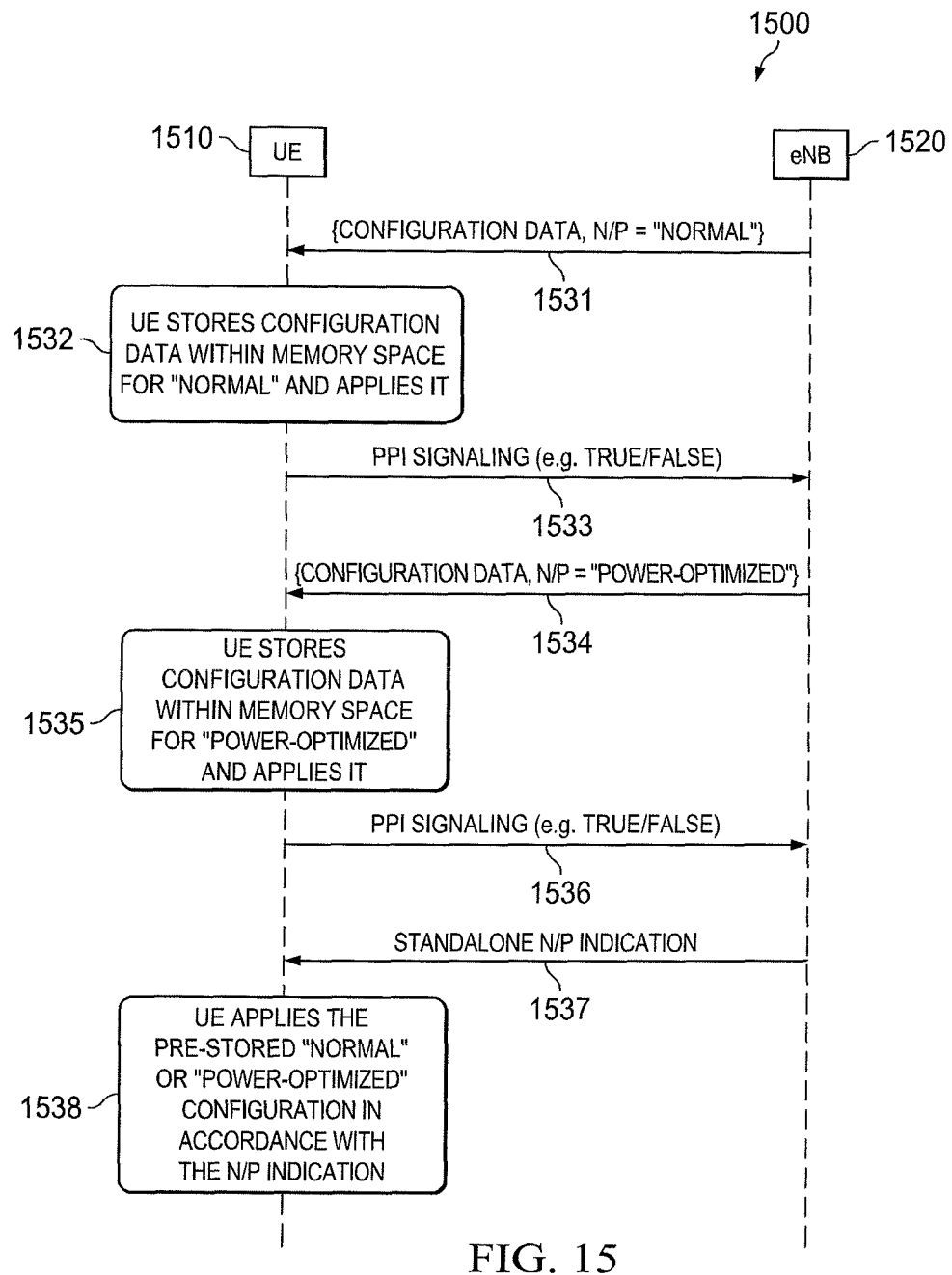
FIG. 15 illustrates another implementation of a procedure of performing an N/P configuration with subsequent power configuration switching via stand-alone N/P indications.

FIG. 15 illustrates another implementation of a procedure 1500 of performing an N/P configuration with subsequent power configuration switching via stand-alone N/P indications. Procedure 1500 may comprise a combination of procedures 1300 and 1400. In procedure 1500, a eNB 1520 may transmit a first N/P indication, for example normal configuration, and a first configuration data related to the N/P configuration indicated by the N/P indication in step 1531 (e.g. normal configuration). A UE 1510 may receive and store the first configuration data in step 1532. The UE 1510 may later perform PPI signaling in step 1533 by requesting a transition to a second configuration, for example power-optimized configuration. The eNB 1520 may respond in step 1534 with a second configuration data related to the second N/P configuration indicated by the N/P indication in step 1533 (e.g. power-optimized configuration). The UE 1510 may store the second configuration date in step 1535. Specifically, the normal and power-optimized configurations may be signaled sequentially in steps 1531-1535, and may be signaled either autonomously by the eNB 1520 or based on previous PPI requests from the UE 1510. Once configuration data for both normal and power-optimized configurations have been stored, switching between configurations based on an N/P indication from the eNB 1520 may be perform via steps 1536-1538, which may be substantially similar to 1433-1435, respectively.

Figure 16:
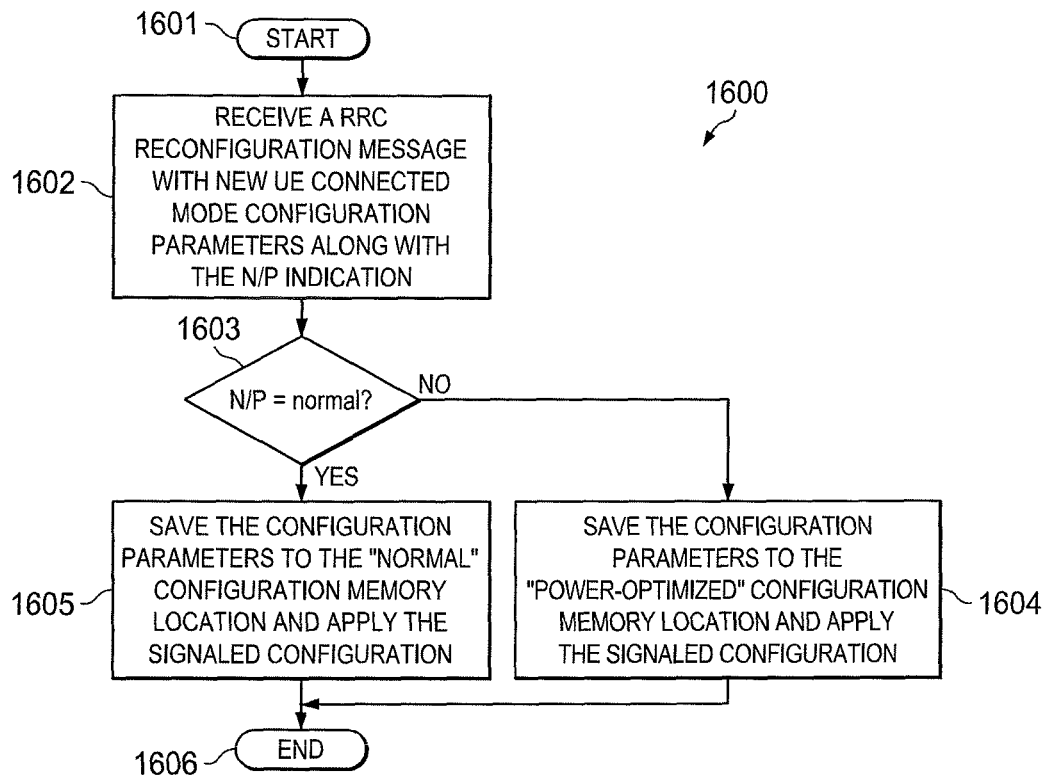
FIG. 16 illustrates an implementation of a method of receiving connected mode configuration parameters.

FIG. 16 illustrates an implementation of a method 1600 of receiving connected mode configuration parameters. As discussed above, an N/P indication may be sent from an eNB to a UE in conjunction with configuration and/or reconfiguration data that defines a specific configuration to apply or to store in memory. If the UE is capable of simultaneously storing more than one configuration, storage of the configurations allows for subsequent recall of one of the configurations without the need for the network to signal the full parameter set each time. Thus, the N/P indication may be used by the UE to determine which storage or memory location to write to, or to overwrite, e.g. a normal storage location or a power-optimized storage location.

Specifically, the UE may start receiving data at step 1601. In step 1602, the UE may receive a RRC reconfiguration message with new UE connected mode configuration parameters along with an N/P indication. At decision block 1603, the UE may determine if the N/P indication is normal. If the N/P indication is normal, the UE may proceed to step 1605, save the configuration parameters in a normal configuration memory location, and apply the signaled configuration. If the N/P indication is not normal (e.g. power-optimized), the UE may proceed to step 1604, save the configuration parameters in a power-optimized configuration memory location, and apply the signaled configuration. Upon completion of step 1604 or 1605, the UE may proceed to step 1606 and end the method 1600. Once the N and P configurations have been transmitted to the UE and stored in memory, the network may then utilize subsequent standalone N/P indications to cause the UE to recall the corresponding configuration from the stored memory location and apply either the normal or power-optimized configurations as discussed in procedures 1400 and 1500.

Figure 17:
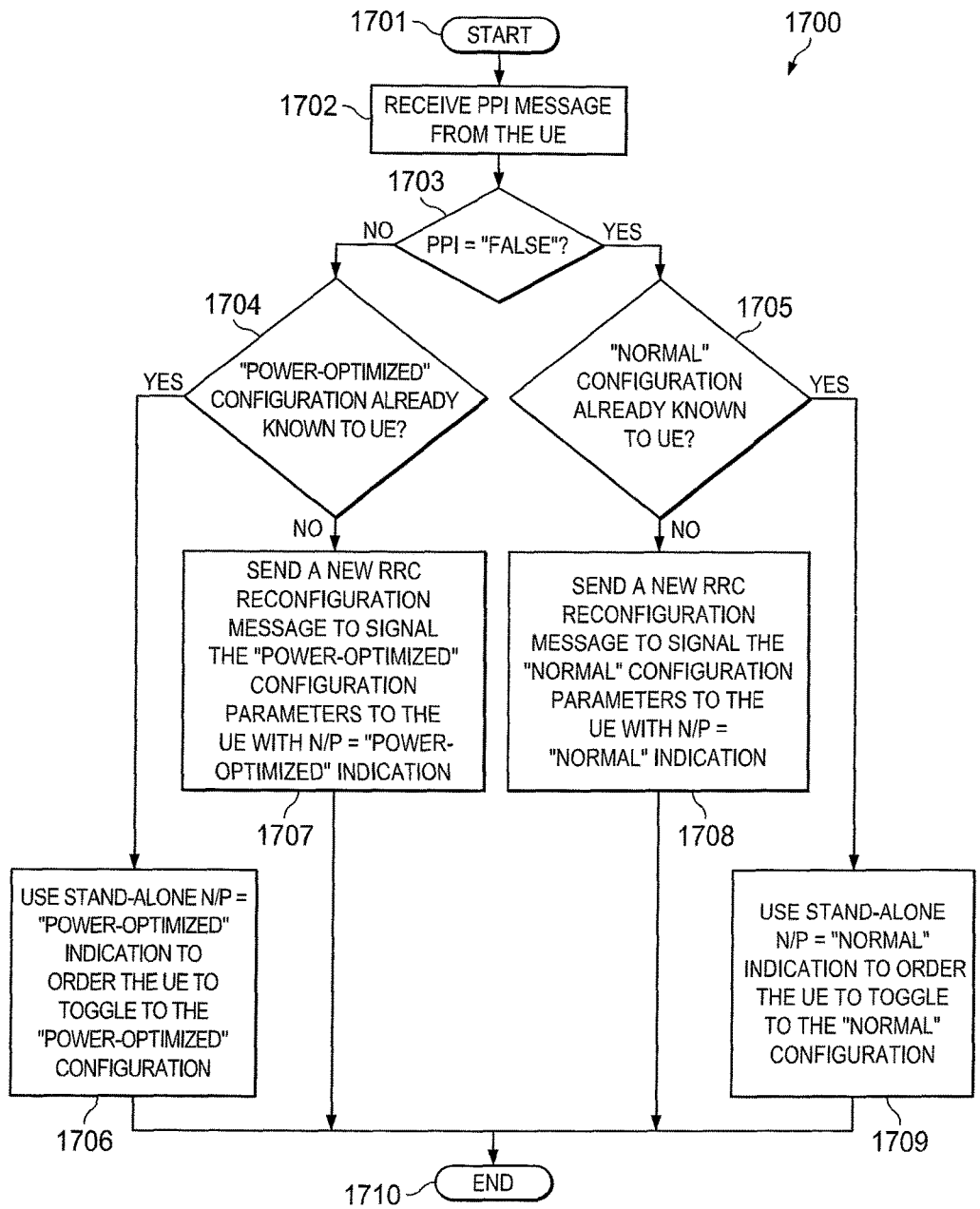
FIG. 17 illustrates an implementation of a method of using a UE's knowledge of N/P configurations to reduce downlink signalling.

FIG. 17 illustrates an implementation of a method 1700 of using a UE's knowledge of N/P configurations to reduce downlink signalling. Upon sending configuration data to the UE, for example in procedures 1300, 1400, and 1500, the network/eNB may retain information indicating which configurations have been sent to the UE to prevent duplicative signalling. In step 1701, the network may await various types of signaing from the UE. In step 1702, the network may receive a PPI message from the UE requesting a N/P configuration change. In decision block 1703, the network may determines if the PPI signaling equals false, which may indicate the UE desires to transition to normal configuration, or equals not false (e.g. true), which may indicate that the UE desires to transition to power-optimized configuration.

If PPI does not equal false (e.g. true) at decision block 1703, the network may move to decision block 1704, where the network may determine if a power-optimized configuration is known to the UE, for example because the power-optimized configuration has been previously sent to the UE. If the power-optimized configuration is known to the UE, the network may proceed to step 1706 and send a standalone N/P indication to the UE to order the UE to toggle to the power-optimized configuration known to the UE. If the power-optimized configuration is not known to the UE, the network may proceed to step 1707 and send a configuration or a reconfiguration message to the UE that comprises the power-optimized configuration data and an N/P indication indicating the UE should transition to power-optimized configuration.

If PPI equal false at decision block 1703, the network may move to decision block 1705, where the network may determine if a normal configuration is known to the UE, for example because the normal configuration has been previously sent to the UE. If the normal configuration is known to the UE, the network may proceed to step 1709 and send a standalone N/P indication to the UE to order the UE to toggle to the normal configuration known to the UE. If the normal configuration is not known to the UE, the network may proceed to step 1708 and send a configuration or a reconfiguration message to the UE that comprises the normal configuration data and an N/P indication indicating the UE should transition to normal configuration. Upon completing any of steps 1706-1709, respectively, the UE may move to step 1710 and end the method 1700.

In implementations and/or methods 1000-1700, once the UE has acquires knowledge of the requested configuration, an N/P indication in a downlink from the network may be used as an explicit grant of the UE's PPI request. Therefore, the N/P indication may act as a trigger to switch to the UE's requested configuration. An alternative strategy may allow the UE to assume an implicit grant for its request unless the network responds explicitly with either a configuration/reconfiguration message, a disallowance, a reject message, and/or an N/P indication in the downlink within a predetermined period of time. This predetermined period of time may be preconfigured in the UE and network or signaled to the UE during a call setup.

Figure 18:
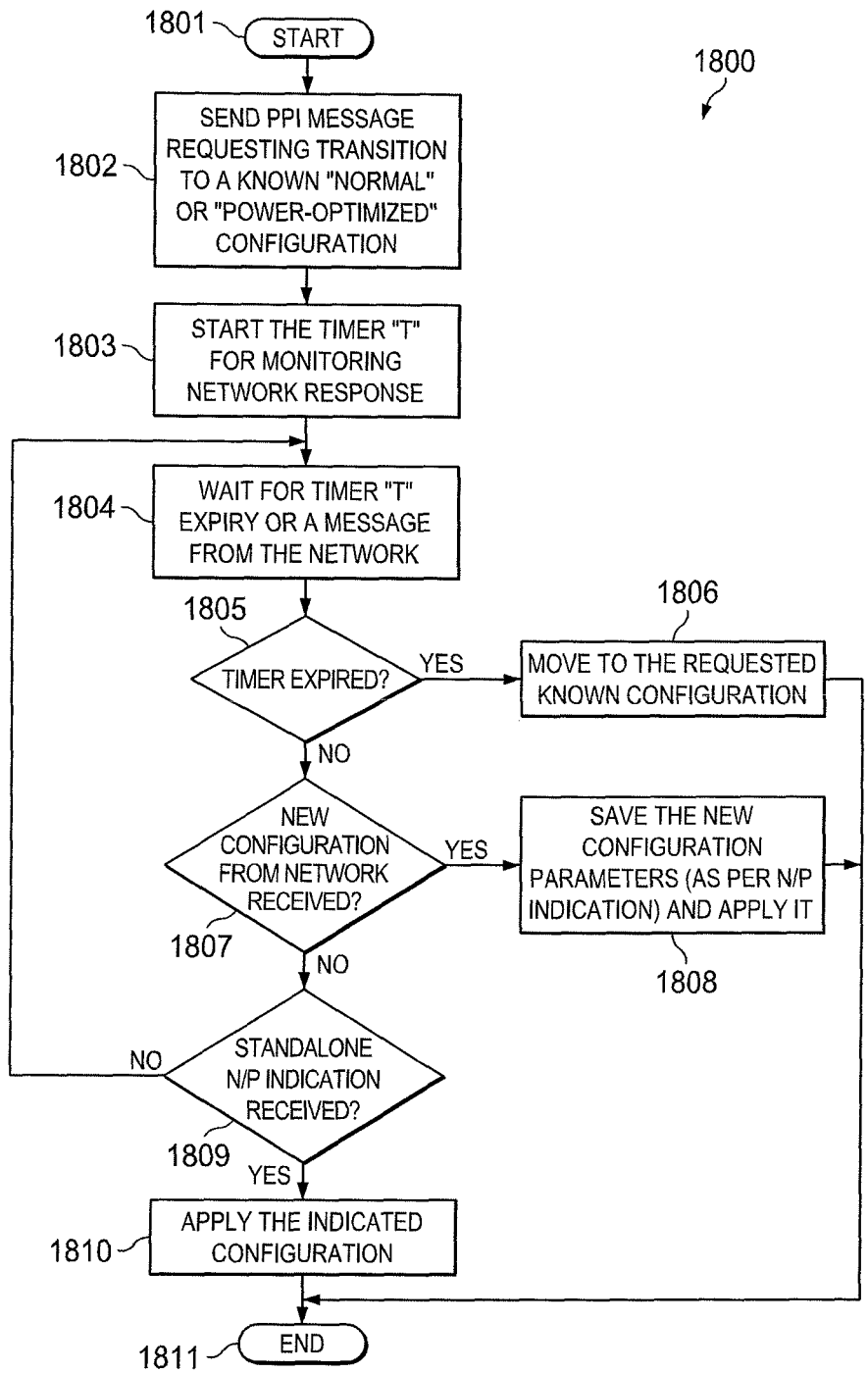
FIG. 18 illustrates an example of a method of implicit grant of a UE's configuration transition request.

FIG. 18 illustrates an implementation of a method 1800 of implicit grant of a UE's configuration transition request. In step 1801, the UE may be performing typical operations. The UE may proceed to step 1802 when the UE wishes to transition to another configuration. In step 1802, the UE may send a PPI message requesting a transition to an N or P configuration already known to the UE. In step 1803, the UE may start a timer and monitor for a network response to the PPI request of step 1802. In step 1804, the UE may wait for the expiration of the timer and/or a responsive message from the network before moving to decision block 1805. At decision block 1805, the UE may determine if the timer has expired. The UE may move to step 1806 if the timer has expired and decision block 1807 if the timer has not expired. In step 1806, the UE may move to the requested configuration, as the network has not responded to the PPI request in the allotted time, and end at step 1811.

If the timer has not expired at decision block 1805, the UE may determine if new configuration data was received from the network at decision block 1807. The UE may transition to step 1808 if new configuration data was received and decision block 1809 if new configuration data was not received. At step 1808, the UE may save and apply the new configuration data and end at step 1811. At decision block 1809, the UE may determine if a standalone N/P indication was received. If a standalone N/P indication was received, the UE may move to step 1810, apply the indicated configuration, and end at step 1811. If a standalone N/P indication was not received at 1809, error handling may occur, which may include returning to step 1802, decision block 1805, and/or sending an error message to the network.

In addition or in the alternative, s UE may, use acquired knowledge of whether the current configuration is normal or power-optimized in order to affect or modify the operation of a timing alignment timer (TAT). For example, upon determining that the current configuration is power-optimized, for example based on either an explicit N/P indication received from the network as described in FIGS. 10-17 or on an implicit mechanism such as described in FIG. 18, the UE may reduce the current value of a timing alignment timer, for example via multiplication by a factor less than about 1 or by setting the timer to a predetermined or preconfigured value, or the UE may force expiration of the timing alignment timer in order to cause one or more uplink transmission resources, such as uplink control channel resources, to be released. In an alternative implementation/method, a pre-configured value may be used to initialize/reset the TAT on each reception of a timing advance command and may be adjusted, scaled, or multiplied in order to generate a new value to be used during a power-optimized mode of operation.

In one example, an eNB may cause one or more uplink resources or uplink resource types assigned to the UE to be released by sending an explicit N/P indication, for example via the RRC or MAC layers, to the UE to set the UE to power-optimized configuration or to cause a toggle from normal to power-optimized configuration. Alternatively, an eNB may cause the release of a UE's uplink resources by refraining from transmitting a reconfiguration message, transmitting a disallowance, transmitting a reject message, and/or transmitting an N/P indication within a time period subsequent to the eNB receiving a PPI request from the UE. For example, in the case where explicit N/P indications are used to force TAT expiration, a rule or procedure may be imposed on the UE. Such a rule may require that upon receiving an N/P indication from the network set to power-optimized, the UE shall consider the TAT to be expired and shall act in accordance with procedures associated with timing alignment timer expiration. The procedures that may be required by such a rule may involve the release of PUCCH or SRS resources. Upon returning to a normal configuration, the TAT may continue to operate in a normal manner, for example the UE may reset the timer to a preconfigured value upon receipt of a timing advance command from the network. Alternatively, if the preconfigured value has been previously adjusted to a new value as a result of entering a power-optimized configuration, the preconfigured value may be restored to its original value upon returning to or entering the normal configuration.

As discussed above, an N/P indication may be sent by the network either in conjunction with configuration/reconfiguration data, or standalone and not in conjunction with (re)configuration data. In the former case, an N/P indication may be sent by the eNB when reconfiguring the UE, for example from normal configuration to power-optimized configuration or vice versa. The reconfiguration may take place in response to the UE's PPI request and/or during connection setup. An IE may be used to indicate whether the current configuration refers to a normal or a power-optimized configuration. Such an IE may be called NormalOrPowerOptConfig and may be included in any of the RRC messages that either configures or reconfigures one or more connected mode radio link parameters. Alternatively a separate RRC message may be used to otherwise carry the IE and/or N/P indication. As an example, the RRC RadioResourceConfigDedicated IE may include the NormalOrPowerOptConfig IE to indicate whether a new connected mode configuration should be considered by the UE as normal or power-optimized, as shown in Table 14.

TABLE 14

Signaling o an N/P indication within a new IE 'NormalOrPowerOptConfig (eNB to UE)

[RRCConnectionSetup] OR [RRCConnectionReconfiguration] OR [RRCConnectionReestablishment]
    RadioResourceConfigDedicated
        NormalOrPowerOptConfig
            NormalOrPowerOpt
    mac-MainConfig
        drx-Config
            onDurationTimer
            drx-InactivityTimer
            drx-RetransmissionTimer
            longDRX-CycleStartOffset TABLE 14-continued Signaling o an N/P indication within a new IE
'NormalOrPowerOptConfig (eNB to UE)

shortDRX
   shortDRX-Cycle
   drxShortCycleTimer

A NormalOrPowerOptConfig that equals 0 may indicate a normal configuration, while a NormalOrPowerOptConfig that equals 1 may indicates a power-optimized configuration.

In the standalone case, an N/P indication may be sent either within existing RRC messages or within a newly defined RRC message. If the N/P indication is sent stand-alone within an existing message, the message may contain the N/P indication, for example a NormalOrPowerOptConfig IE, but may not contain other associated configuration data, for example a drx-Config or a PhysicalConfigDedicated message. The N/P indication may be used to switch the UE between previously stored normal and power-optimized configurations. If sent standalone within a newly defined message, the new message may simply be defined to contain the new NormalOrPowerOptConfig IE on its own in downlink. This message may also be used as a command to toggle between two different known, or pre-stored, configurations. The new RRC message may be called NormalOrPowerOptConfigCommand as shown in table 15.

TABLE 15

RRC message to signal a
stand-alone N/P indication

NormalOrPowerOptConfigCommand
   NormalOrPowerOptConfig

As discussed above, an N/P indication may be transmitted to a UE using MAC level signaling. Multiple MAC level signaling options may be used to indicate the N/P indication in downlink. In one implementation, two different MAC PDU subheaders may be used to signal N/P=0 (e.g. use normal configuration) and N/P=1 (e.g. use power-optimized configuration), respectively. Each subheader may be addressed to a different Logical Channel ID (LCID) as shown in table 16 below. New MAC Control elements may not be needed in this implementation, as these new MAC subheaders may not require a corresponding MAC CE to be included because the presence of the LCID field may be sufficient to convey the N/P indication.

TABLE 16

MAC PDU headers defined to indicate N/P indication

| Index | LCID values |
|---|---|
| 00000 | CCCH |
| 00001-01010 | Identity of the logical channel |
| 01011-11000 | Reserved |
| 11001 | N/P = 0 (normal configuration command) |
| 11010 | N/P = 1 (power optimised configuration command) |
| 11011 | Activation/Deactivation |
| 11100 | UE Contention Resolution Identity |
| 11101 | Timing Advance Command |
| 11110 | DRX Command |
| 11111 | Padding |

In another implementation, a MAC PDU subheader may be used along with a 1 byte payload MAC CE, where the payload MAC CE field may be used to distinguish between N/P=0 (e.g. normal configuration) and N/P=1 (e.g. power-optimized configuration) cases. One new MAC subheader may be needed with a single LCID as shown in Table 17.

TABLE 17

New MAC PDU header defined to indicate
N/P indication along with the MAC CE

| Index | LCID values |
|---|---|
| 00000 | CCCH |
| 00001-01010 | Identity of the logical channel |
| 01011-11001 | Reserved |
| 11010 | N/P indication |
| 11011 | Activation/Deactivation |
| 11100 | UE Contention Resolution Identity |
| 11101 | Timing Advance Command |
| 11110 | DRX Command |
| 11111 | Padding |

Figure 19:
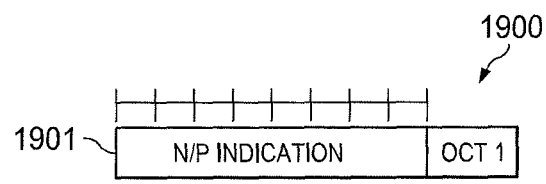
FIG. 19 illustrates an implementation of a MAC layer control element comprising an N/P indication.

FIG. 19 illustrates an implementation of a MAC layer control element 1900 comprising an N/P indication value field 1901. The control element 1900 may be 1 octet in length and may be defined to distinguish between N/P=0 (e.g. normal configuration) and N/P=1 (e.g. power-optimized configuration) cases. The interpretation of the N/P indication value field 1901 may be as shown in Table 18.

TABLE 18

N/P indication field value

| Index | N/P indication |
|---|---|
| 0 | Apply normal configuration |
| 1 | Apply power optimised configuration |
| 2-63 | Reserved |

The N/P indication on may be sent in downlink to command the UE to switch between known configurations or to indicate whether the current configuration should be considered as a normal configuration or a power-optimized configuration. If the current downlink message contains an RRCReconfigurationMessage along with a MAC PDU indicating an N/P indication, the N/P indication may be considered as a message indicating that the current configuration signaled in the RRCReconfigurationMessage refers to a configuration of type described by the N/P indication. If the N/P indication is received in the downlink without an RRCReconfigurationMessage, then the UE may treat the N/P indication as a command to recall and apply a preconfigured configuration in accordance with the received N/P indication.

PPI signaling may be sent by the UE to the eNB either during a connection setup procedure or at another time during connected mode, for example due to a change in the UE's preference. RRC based PPI signaling may be used and may provide advantages during connection setup. RRC based PPI signaling is also described further below. However, RRC based PPI signaling may incur extra overhead as such signaling may be sent in RLC acknowledged mode, which may require additional acknowledgements as discussed above. A MAC based signaling option may reduce extra signaling as discussed below.

In RRC based PPI signaling, an IE called PowerPreferenceIndication may be defined to indicate the UE's preference for a normal or a power-optimized configuration. This IE may be included in any RRC control message on the UL, such as RRCConnectionRequest, RRCConnectionSetupComplete, RRCConnectionReestablishmentRequest, RRCConnectionReconfigurationComplete and/or RRCConnectionReestablishmentComplete. The PowerPreferenceIndication IE may also be included within a MeasurementReport message or within a UEInformationResponse message. A PowerPreferenceIndication set to true may indicate that the UE prefers a power-optimized configuration or idle mode depending on the current configuration as discussed above. A PowerPreferenceIndication set to false may indicate that the UE prefers a normal configuration. Alternatively, a RRC message in uplink may be defined to allow the UE to send a PPI request in uplink as a standalone request. The RRC message may be termed a PowerPreferenceIndicationMessage as shown in Table 19.

TABLE 19

RRC message to facilitate signaling of PPI

PowerPreferenceIndicationMessage
PowerPreferenceIndication

In a first implementation of MAC layer PPI signaling, two different MAC PDU subheaders may be used to signal PPI equals true and PPI equals false, respectively. Each subheader may be addressed to a different LCID as shown in Table 20. New MAC Control elements may not be needed in this case as the new MAC subheaders may not require a corresponding MAC CE to be included because the presence of the LCID field may be sufficient to convey the PPI information.

TABLE 20

LCID that accommodates the first implementation of MAC Layer PPI signaling

| Index | LCID values |
|---|---|
| 00000 | CCCH |
| 00001-01010 | Identity of the logical channel |
| 01011-10110 | Reserved |
| 10111 | Power Preference Indication = "UE power saving desirable" |
| 11000 | Power Preference Indication = "UE power saving not required" |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In a second implementation of MAC layer PPI signaling, a MAC PDU subheader may be employed along with a 1 byte payload, where the payload field may be used to distinguish between PPI equals true and PPI equals false indications. One new MAC subheader may be used with the LCID as shown in Table 21.

TABLE 21

LCID to accommodate the second implementation of MAC Layer PPI signaling

| Index | LCID values |
|---|---|
| 00000 | CCCH |
| 00001-01010 | Identity of the logical channel |
| 01011-10111 | Reserved |
| 11000 | UE Power Preference Indication |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Figure 20:
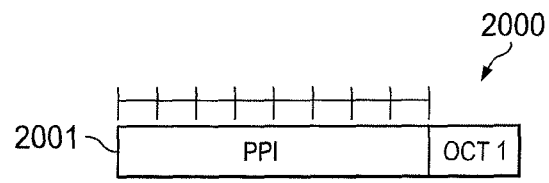
FIG. 20 illustrates an implementation of a PPI MAC layer control element.

FIG. 20 illustrates an implementation of a PPI MAC layer control element 2000. The control element may comprise a PPI field 2001 that may be used to distinguish between the PPI equals true and PPI equals false. The interpretation of the PPI field may be as shown in Table 22.

TABLE 22

PPI field value

| Index | PPI |
|---|---|
| 0 | UE power saving desirable (or idle mode preferred when sent from power-optimised configuration) |
| 1 | UE power saving not required (normal configuration is preferred) |
| 2-63 | Reserved |

The MAC PPI signaling may be used to signal the PPI at any time during an RRC connection or during an RRC connection setup procedure, for example by including the MAC subheader of table 21 and MAC CE 2000 in a message carrying a RRC connection setup complete message.

Figure 21:
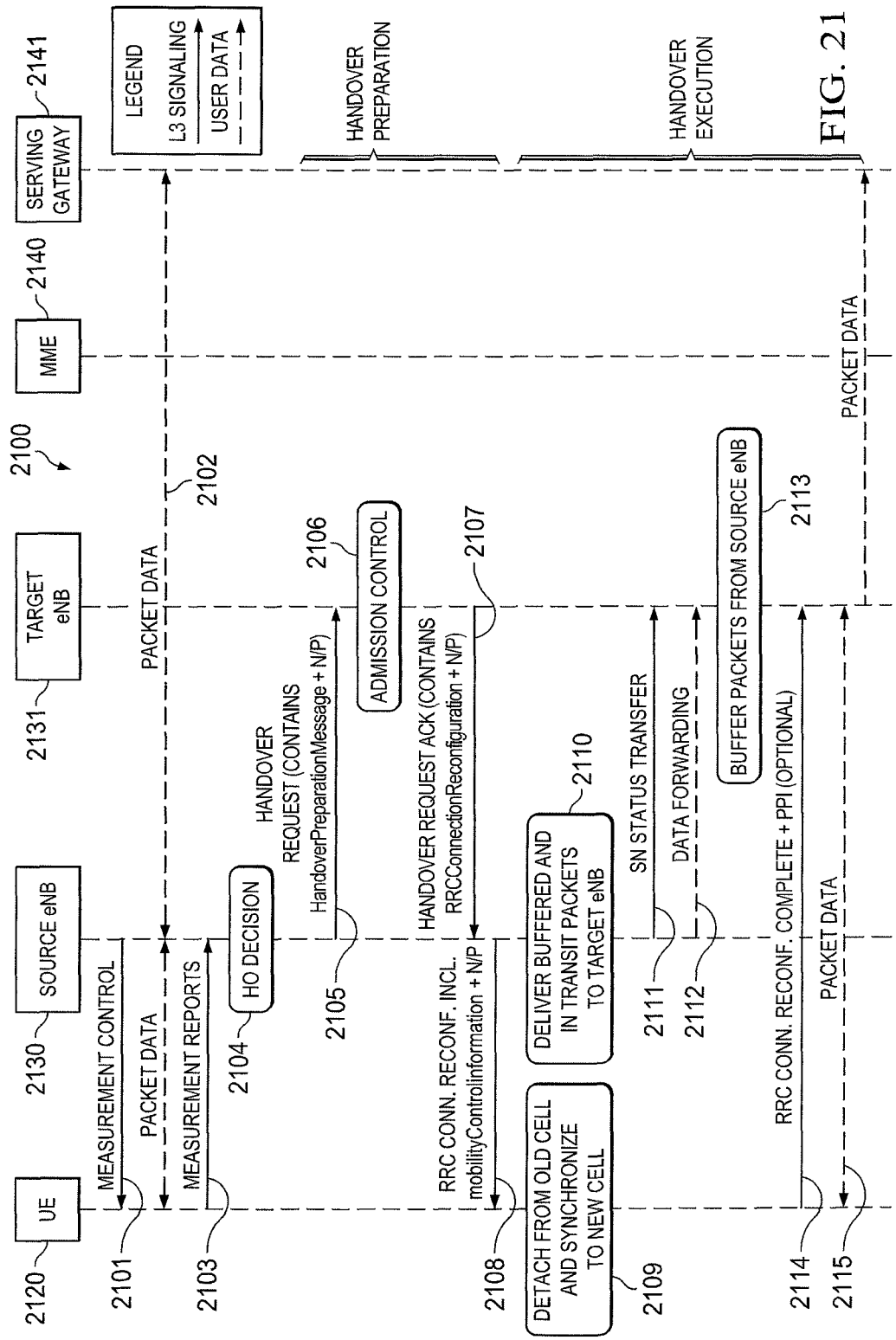
FIG. 21 illustrates an implementation of an X2 interface handover procedure.
Figure 22:
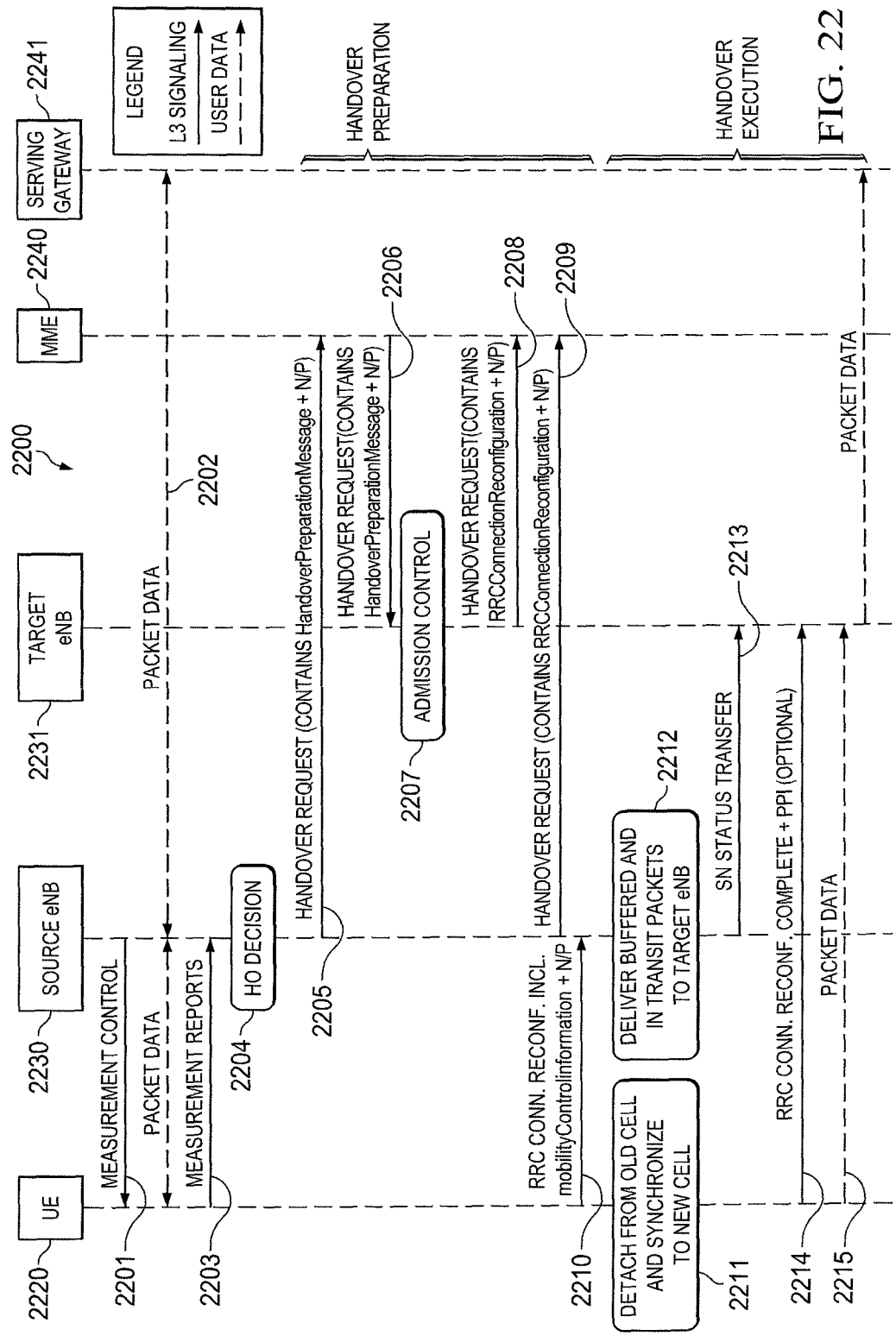
FIG. 22 illustrates an implementation of an evolved Universal Mobile Telecommunications System (UMTS) Terrestrial Radio Access Network (E-UTRAN) to Evolved Packet Core (EPC) (S1) interface handover procedure.

FIGS. 21-22 illustrate implementations of an X2 interface handover procedure 2100 and of a S1 handover procedure 2200, respectively. Handover procedure 2100 may be substantially similar to handover procedure 800, and handover procedure 2200 may be substantially similar to handover procedure 900, except handover procedures 2100 and 2200 may support UE assistance signaling.

In order to support UE assistance signaling, procedures 2100-2200 may require a mechanism for the eNB associated with the source cell to indicate to the eNB associated with the target cell the current UE configurations, such as any stored N and P configurations. The procedures 2100-2200 may also require a mechanism to signal whether the UE is currently in normal configuration or power-optimized configuration. Additionally, procedures 2100-2200 may require mechanisms for the eNB associated with the target cell to have the ability to reconfigure the UE into a new connected mode configuration and to signal whether the new configuration is a normal configuration or a power-optimized configuration.

During handover, the source cell may convey the connected mode configuration parameters to the target cell via a HandoverPreperationInformation message. The N/P indication may be transmitted within the HandoverPreparation- Information message, for example within a constituent RRM Config IE, a constituent as-config IE, or within a new IE or message that is transferred between the source cell and target cell during handover. The target cell may subsequently know both the current configuration(s) of the UE and whether the UE is currently in normal or power optimized configuration in the source cell. The modified HandoverPreparationInformation IE may accommodate either or both of the N and P configurations. The HandoverPreparationInformation IE may also carry an additional N/P indication to indicate the current configuration of the UE. Such data structures are shown in Table 23.

TABLE 23

Signaling of one or both of the normal/power-optimized configurations during handover preparation (source eNB to target eNB)

HandoverPreparationInformation
   as-Config
      RadioResourceConfigDedicated
         N/P indication
         <other details not shown>
      RadioResourceConfigDedicated
         N/P indication
         <other details not shown>
      N/P indication
         <other details not shown>

The first RadioResourceConfigDedicated IE may include configuration parameters for the normal configuration in the source cell that are applied to the UE, in which case the N/P indication indicates N. Similarly, the second RadioResourceConfigDedicated IE may indicate the configuration parameters corresponding to the power-optimized configuration, in which case the second N/P indication may indicate P. Further a third N/P indication may be included to signal which configuration is currently applicable at the UE. Using the knowledge from the HandoverPreparationInformation, the target cell may reconfigure the UE with the target cell's own normal or power optimized configuration as needed. If new normal and/or power-optimized configurations are signaled by the target cell to the UE via an RRCConnectionReconfiguration message sent as part of the handover procedure, the UE may delete any stored normal and/or power-optimized configurations received from the source cell and store the newly signaled configurations.

Specifically, modifying the HandoverPreparationInformation IE to carry the N/P indication and related configurations, procedure 800 may become procedure 2100 and procedure 900 may become procedure 2200, respectively. In procedure 2100, components 2120, 2130-2131, and 2140-2141 may be substantially similar to components 820, 830-831, and 840-841. Additionally, steps 2101-2115 may be substantially similar to steps 801-815. However, in step 2105 the HandoverPreparationInformation sent between the source eNB 2130 and the target eNB 2131 may comprise the UE's 2120 N and P configuration data as well as the UE's 2120 current configuration. In step 2107, the RRCconnectionReconfiguration message sent between the target eNB 2131 and the source eNB 2130 may contain N and P configuration data set by the target eNB 2131 and an indication from the target eNB 2131 which configuration the UE 2120 should apply. In step 2108, the source eNB 2130 may forward the N/P information from the target eNB 2131 to the UE 2120. In step 2114, the UE 2120 may also perform PPI signaling with the target eNB 2131 as part of sending the RRC Connection Reconfiguration Complete message if the UE 2120 wishes to transition to another configuration/mode.

In procedure 2200, components 2220, 2230-2231, and 2240-2241 may be substantially similar to components 920, 930-931, and 940-941. Additionally, steps 2201-2215 may be substantially similar to steps 901-915. However, in step 2205 the HandoverPreparationInformation sent between the source eNB 2230 and the MME 2240 may comprise the UE's 2220 N and P configuration data as well as the UE's 2220 current configuration. The HandoverPreparationInformation may be forwarded to the target eNB 2231 in step 2206. In step 2208, the RRCconnectionReconfiguration message sent between the target eNB 2231 and the MME 2240 may contain N and P configuration data set by the target eNB 2231 and an indication from the target eNB 2231 which configuration the UE 2220 should apply. In step 2209, the MME 2240 may forward the RRCconnectionReconfiguration message to the source eNB 2230. The source eNB may then forward the N/P information from the target eNB 2231 to the UE 2220. In step 2214, the UE 2220 may also perform PPI signaling with the target eNB 2231 as part of sending the RRC Connection Reconfiguration Complete message if the UE 2220 wishes to transition to another configuration/mode.

As discussed above, in the case of a radio link failure, a UE may initiate a RRC Connection Reestablishment procedure. If a UE attempts to re-establish a connection in a new cell after radio link failure, the target cell may acquire the knowledge of the connected mode configuration of the UE and inform the source cell via the information sent in the HandoverPreparationInformation IE. The HandoverPreparationInformation IE may have been previously sent in an unsolicited fashion by the source eNB to the target eNB, or may be sent by the source eNB following receipt of a request for the information from the target eNB.

As discussed in procedures 2100-2200, the HandoverPreparationInformation IE may contain the UE's N/P configuration details along with information regarding whether the UE was in a power-optimized configuration in the source cell. Alternatively, the UE may include a PPI preference within an RRCConnectionReestablishmentRequest message in order to convey its preference for a normal or power-optimized configuration to the target eNB during the re-establishment procedure. Subsequently, the target cell may take the UE's N/P information into account when reconfiguring the UE with an appropriate configuration, for example via an RRCConnectionReestablishment message sent to the UE. The target cell may also consider the UE's N/P information when determining an action to take, such as determining whether to accept, reject, or postpone a re-establishment procedure. For example, as data latency may be less important for a power-optimized UE, the network policy may be to reject any RRC connection Reestablishment initiated by a UE known to have been in a power-optimized configuration prior to RLF. This policy may cause the UE to revert to idle mode and perform RLF recovery via existing Core Network Non-Access-Stratum based procedures, in which the UE may transmit a Tracking Area Update to the core network. For any data arriving at a later time, a subsequent RRC connection may be established per typical connection setup procedures.

UE's in a connected mode power-optimized configuration may experience degradation in mobility performance; and therefore the prevalence of Radio Link Failure for such UE's may increase. The increased incidence of RLF may be due to, for example, delays in signal strength and/or quality measurements at the UE, which may be caused by longer DRX cycles, and/or due to delays in signaling related to measurement reporting and/or handover signaling.

In most systems, a UE may be required to perform an RRC connection re-establishment procedure upon radio link failure. However, this requirement may be modified such that the UE may take into account its current configuration in the source cell before the RLF event when deciding how to respond after the RLF event. For example, the UE may take into account its current configuration (e.g. N/P) and/or its current PPI preference in deciding whether to initiate a RRC connection reestablishment procedure upon radio link failure or to delay the procedure until new uplink data is available in the uplink buffer. As power-optimized connected mode UEs may suffer increased risk of RLF, a determination by the UE of a proper response to an RLF may reduce signaling loads associated with RLF. Signaling loads may be reduces because the RRC re-establishment and/or subsequent RRC setup procedure need not occur until there is a renewed need to send user plane data as the time until the next data packet transmission may be relatively long. It should be noted that in the scenario where the UE delays the initialization of an RRC connection reestablishment procedure, the network may not be aware that the UE has suffered an RLF, which may result in the loss of any downlink data being sent to the UE. To avoid this scenario, the UE may be required to perform a tracking area update upon RLF in order to inform the network about its new location per the NAS-based recovery mechanism. However, the UE may still delay a new RRC connection reestablishment procedure for application or user-plane data traffic.

Figure 23:
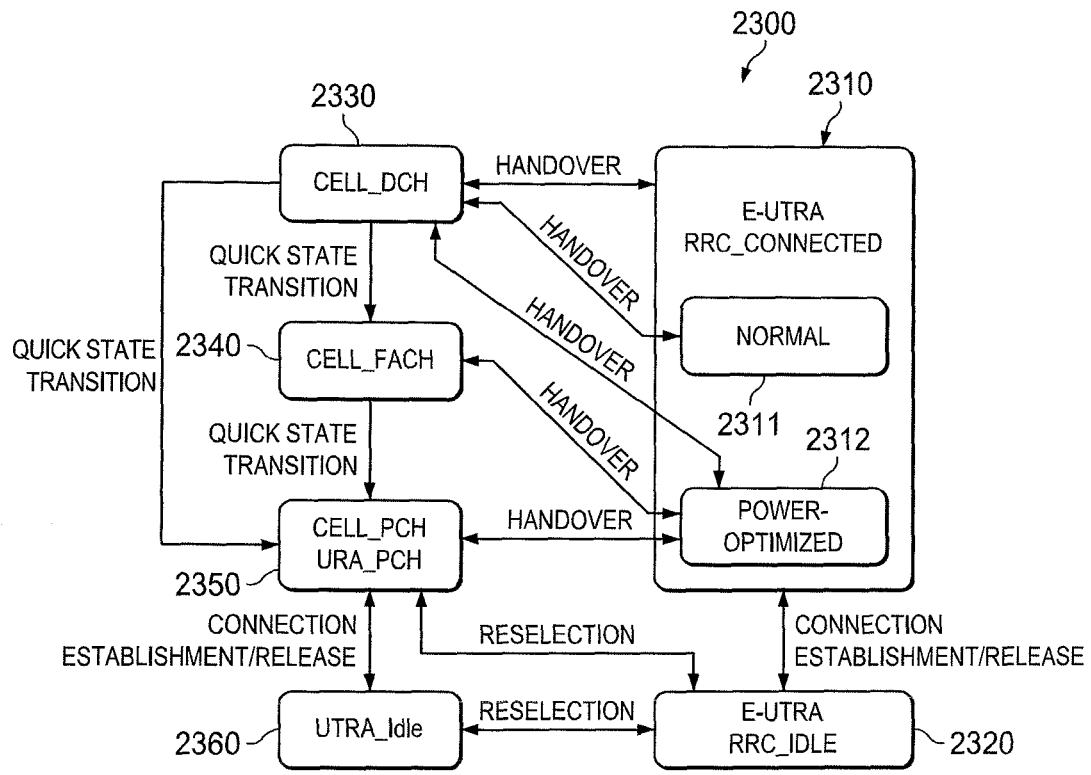
FIG. 23 illustrates an implementation of a UE N/P configuration transition during a handover between differing radio access technologies (RATs).

FIG. 23 illustrates an implementation of a UE N/P configuration transition 2300 during a handover between differing RATs. As discussed above, a LTE connection may comprise an E-UTRA RRC Connected mode 2310 and an E-UTRA RRC idle mode 2320. The RRC Connected mode 2310 may comprise a normal configuration 2311 and a power-optimized configuration 2312. A UE may transition between 2310-2312 and 2320 as discussed above. It may be advantageous to convert the UE's current mode/configuration to power-optimized modes in a differing RAT during a handover. For example, it may be desirable to perform a handover from a LTE network to a UTRAN network and perform a transition from a given LTE power configuration/mode to a similar power mode in the UTRAN network. As discussed above, UTRAN may comprise a CELL_DCH mode 2330, a CELL_FACH state 2340, a CELL/URA_PCH state 2350, and a UTRA Idle state 2360. Transitions between LTE connected mode power-optimized 2312 and UTRAN Cell_FACH 2340 or CELL/URA_PCH states 2350 may be desirable.

Connected mode mobility between LTE and UTRAN may involve a transition from LTE connected mode 2310 to UTRAN Cell_DCH 2330. Transitions directly to/from LTE connected mode 2310 from/to the other UTRAN connected states 2340, 2350, and/or 2360 may not be supported in current systems. However, additional transition options as shown in FIG. 23 may be supported. To enable the additional transition options, a source eNB may indicate to a UTRAN Radio Network Controller (RNC) that the UE is currently power-optimized 2312. The UTRAN RNC may take the power-optimized configuration 2312 of the UE into account in a multiple of ways. As examples, the UTRAN RNC may (1) initialize the UE directly into CELL_FACH state 2340; (2) initialize the UE directly into the CELL/URA_PCH state 2350; (3) initialize the UE to CELL_DCH 2330, and subsequently transition the UE quickly to CELL_FACH 2340 and/or PCH state 2350 on completion of the handover; and/or (4) initialize the UE in CELL_FACH 2340 and subsequently transition the UE quickly to CELL/URA_PCH 2350 on completion of handover. Thus, the source eNB may indicate to the RAN associated with the target cell, for example the UTRAN cell, that the UE is currently in a power-optimized configuration 2310 in the source cell and request the target cell to move the UE to a power-optimized state after the handover. For example, in the case of UTRAN, an indication of power-optimization received from the source cell may be interpreted by the target cell to perform one of the above listed options.

Figure 24:
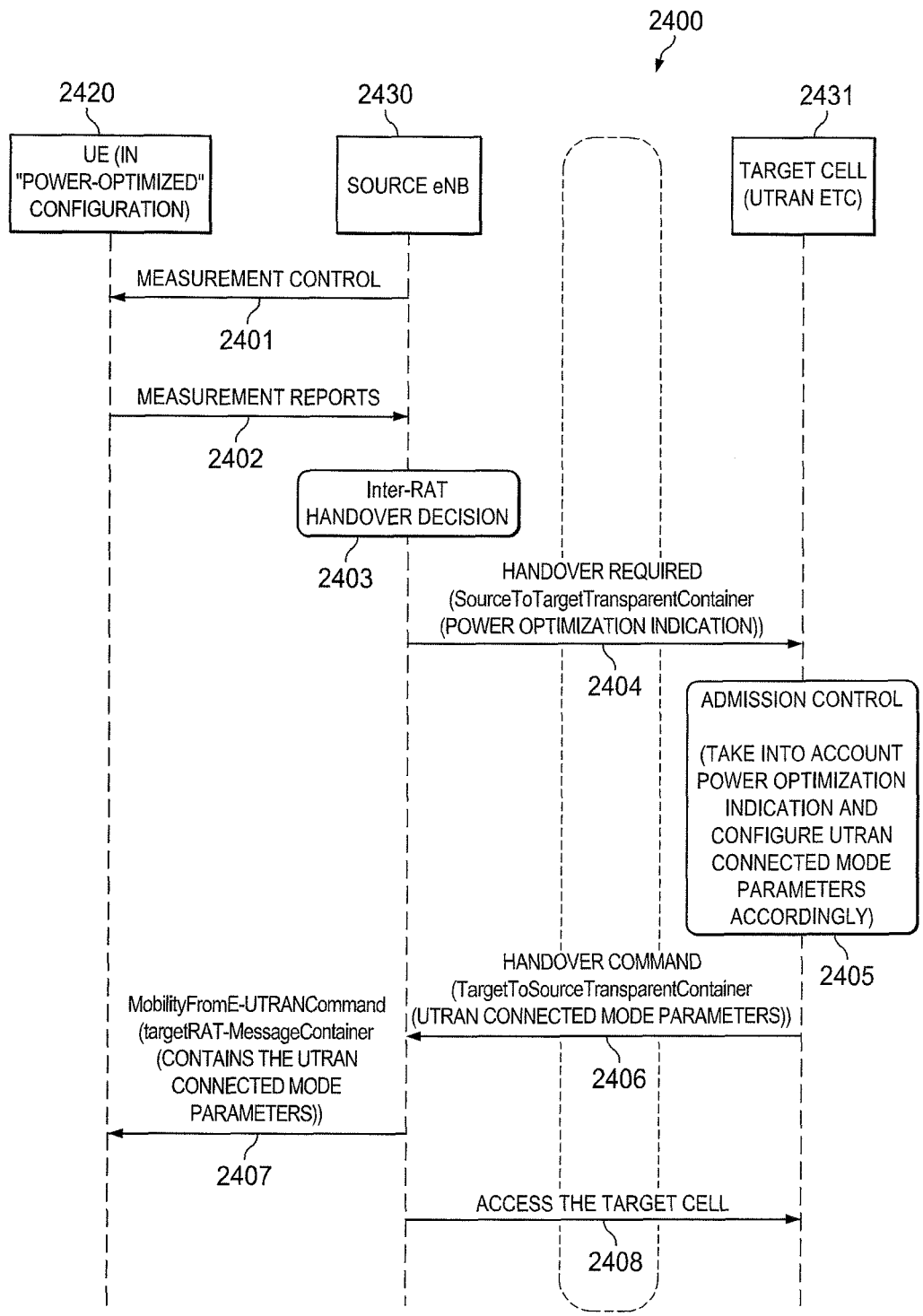
FIG. 24 illustrates an implementation of an inter-RAT handover procedure utilizing N/P indication.

FIG. 24 illustrates an implementation of an inter-RAT handover procedure 2400 utilizing N/P indication. Procedure 2400 may be used to handover a UE 2420 in a power-optimized configuration from a source eNB 2430 in a network using a first RAT, such as a LTE, to a target cell 2431 in a network using a second RAT, such as a UTRAN. In step 2401, source eNB 2430 may request that the UE 2420 perform measurements on neighboring cells. In step 2402, the UE may send a measurement report to source eNB 2430. In step 2403, source eNB 2430 may review the measurement report and determine to perform an Inter-RAT handover to target cell 2431. In step 2404, the source eNB 2430 may transmit a Handover Required message to the target cell 2431. The Handover Required message may comprise a SourceToTargetTransparentContainer IE, which may comprise a power optimization indication. In step 2405, a RAN associated with the target cell may construct a connected mode configuration which may be used to transition the UE 2420 to a power-optimized state in the new cell, for example using transition 2300. For example, if the target cell 2431 is a UTRAN network, the target cell may configure timers such as the CELL_DCH to CELL_FACH inactivity timer and/or tailor the DRX parameters to enable power optimization at the UE 2420. The constructed configuration of step 2405 may be transmitted from the target cell 2431, for example the UTRAN network, to the source eNB 2430. The constructed configuration may be located within a Handover Command and sent to the source eNB in step 2406. The constructed configuration may then be further transmitted to the UE 2420 by the source eNB 2430 in step 2407. For example, the constructed configuration may be transmitted in a MobilityFrom-E-UTRANCommand Message. In step 2408, the source eNB 2430 may handover access to the target cell.

In an alternative implementation of an inter-RAT handover, the source eNB 2430 may release the RRC connection and to redirect the UE 2420 to a target cell 2431 in another RAT, for example to a UTRAN network. Once the RRC connection has been released, the UE 2420 may transition to idle mode, may reselect the target cell 2431, and subsequently access the target cell 2431 using typical access procedures in the target RAT. The procedure of UE reselection may result in reduced signaling between the networks as the networks may not be required to execute an inter-RAT handover, which may involve heavy signaling across various network interfaces. However, the UE reselection procedure may incur increased latency compared to an inter-RAT handover procedure 2400. As latency may not be a priority for a power-optimized UE, the UE reselection procedure may be a useful method of affecting inter-RAT mobility. If the UE subsequently spends significant time in idle mode before moving back into connected mode in the new cell, for example upon resumption of data activity, the UE reselection procedure may allow the UE to benefit from an overall reduction in power consumption along with saving in signaling. In contrast, latency may be of more importance for a UE in normal configuration, and in this case, the inter-RAT handover procedure 2400 may be beneficial. Thus, an eNB wishing to move an UE to another RAT, such as UTRAN may wish to take into account the current configuration of the UE when deciding whether to proceed with an inter-RAT handover procedure such as 2400 or to use RRC Release with redirection. A decision process in network may therefore operate as shown in Table 24.

TABLE 24

Inter-RAT mobility procedure in network

| LTE connected mode configuration | Inter-RAT mobility procedure |
|---|---|
| Normal | Inter-RAT Handover |
| Power-optimized | RRC Release + redirection to other RAT |

For inbound mobility to LTE from other RATs, similar mechanisms and principles may be utilized to allow a UE to be initialized with a particular connected mode configuration in LTE, such as normal/power-optimized. The decision to place the UE in N or P configuration may be based on power optimization information and/or other related/similar information received from the other RAT.

While procedures 2300-2400 are primarily focused on inter-RAT mobility between LTE and UTRAN, a person of ordinary skill in the art shall appreciate that similar procedures and principles may apply for mobility between any two different RATs.

Figure 25:
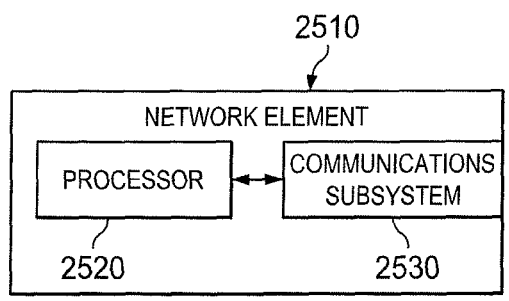
FIG. 25 is an implementation of a simplified block diagram of an exemplary network element.

The above mentioned procedures and/or devices may be implemented by a network element. A simplified network element is shown with regard to FIG. 25. In FIG. 25, network element 2510 includes a processor 2520 and a communications subsystem 2530, where the processor 2520 and communications subsystem 2530 cooperate to perform the methods described above.

Figure 26:
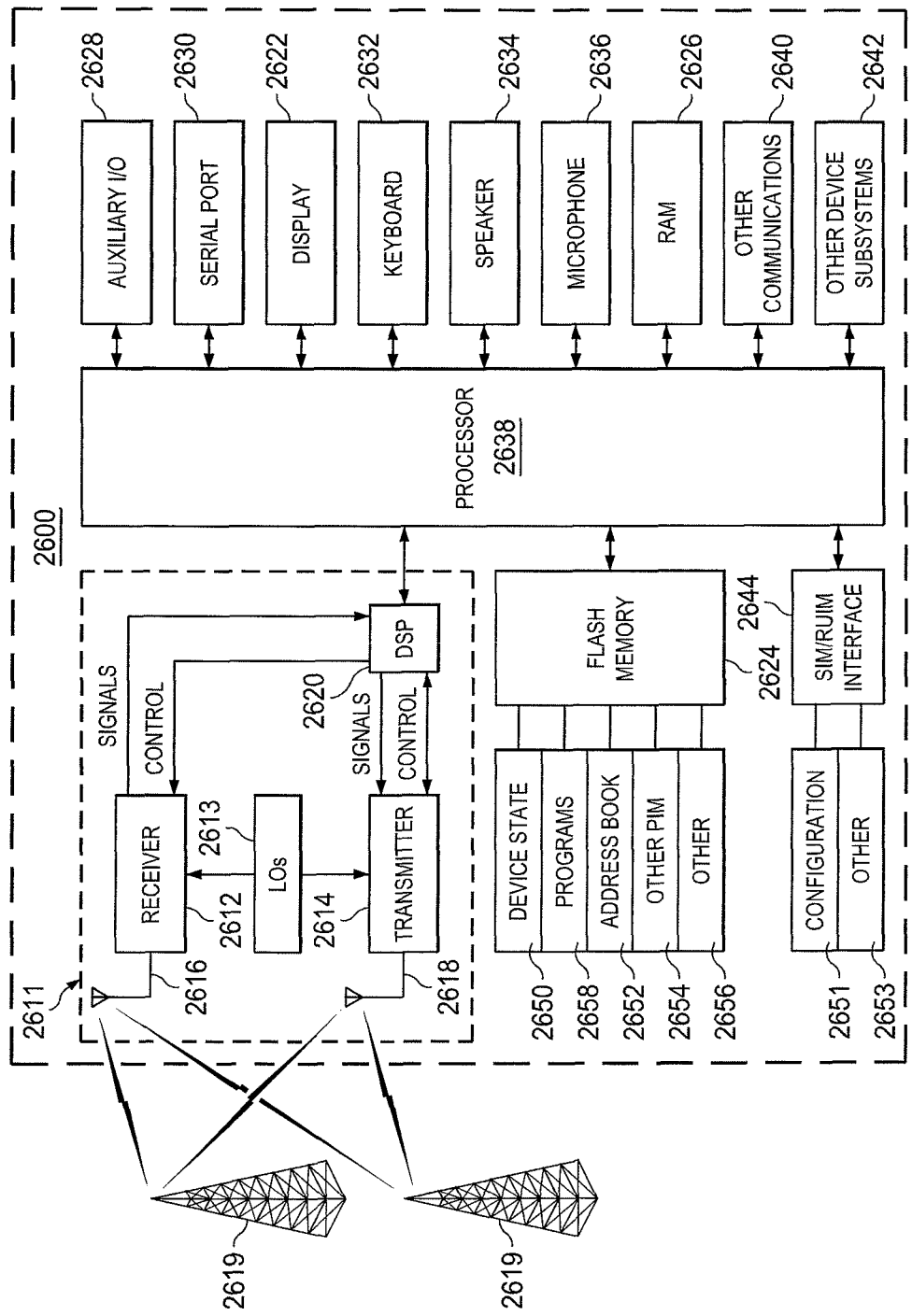
FIG. 26 is a block diagram with an example user equipment capable of being used with the systems and methods in the implementations described herein.

Further, the above may be implemented by a UE. An example of a UE is described below with regard to FIG. 26. UE 2600 may comprise a two-way wireless communication device having voice and data communication capabilities. In some implementations, voice communication capabilities are optional. The UE 2600 generally has the capability to communicate with other computer systems on the Internet. Depending on the exact functionality provided, the UE 2600 may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the UE 2600 is enabled for two-way communication, it may incorporate a communication subsystem 2611, including a receiver 2612 and a transmitter 2614, as well as associated components such as one or more antenna elements 2616 and 2618, local oscillators (LOs) 2613, and a processing module such as a digital signal processor (DSP) 2620. The particular design of the communication subsystem 2611 may be dependent upon the communication network in which the UE 2600 is intended to operate.

Network access requirements may also vary depending upon the type of network 2619. In some networks, network access is associated with a subscriber or user of the UE 2600. The UE 2600 may require a removable user identity module (RUIM) or a subscriber identity module (SIM) card in order to operate on a network. The SIM/RUIM interface 2644 is typically similar to a card slot into which a SIM/RUIM card may be inserted. The SIM/RUIM card may have memory and may hold many key configurations 2651 and other information 2653, such as identification and subscriber-related information.

When required network registration or activation procedures have been completed, the UE 2600 may send and receive communication signals over the network 2619. As illustrated, the network 2619 may consist of multiple base stations communicating with the UE 2600.

Signals received by antenna 2616 through communication network 2619 are input to receiver 2612, which may perform such common receiver functions as signal amplification, frequency down conversion, filtering, channel selection, and the like. Analog to digital (A/D) conversion of a received signal allows more complex communication functions, such as demodulation and decoding to be performed in the DSP 2620. In a similar manner, signals to be transmitted are processed, including modulation and encoding for example, by DSP 2620 and are input to transmitter 2614 for digital to analog (D/A) conversion, frequency up conversion, filtering, amplification, and transmission over the communication network 2619 via antenna 2618. DSP 2620 not only processes communication signals but also provides for receiver and transmitter control. For example, the gains applied to communication signals in receiver 2612 and transmitter 2614 may be adaptively controlled through automatic gain control algorithms implemented in DSP 2620.

The UE 2600 generally includes a processor 2638 which controls the overall operation of the device. Communication functions, including data and voice communications, are performed through communication subsystem 2611. Processor 2638 also interacts with further device subsystems such as the display 2622, flash memory 2624, random access memory (RAM) 2626, auxiliary input/output (I/O) subsystems 2628, serial port 2630, one or more keyboards or keypads 2632, speaker 2634, microphone 2636, other communication subsystem 2640 such as a short-range communications subsystem, and any other device subsystems generally designated as 2642. Serial port 3230 may include a USB port or other port currently known or developed in the future.

Some of the illustrated subsystems perform communication-related functions, whereas other subsystems may provide "resident" or on-device functions. Notably, some subsystems, such as keyboard 2632 and display 2622, for example, may be used for both communication-related functions, such as entering a text message for transmission over a communication network, and device-resident functions, such as a calculator or task list.

Operating system software used by the processor 2638 may be stored in a persistent store such as flash memory 2624, which may instead be a read-only memory (ROM) or similar storage element (not shown). The operating system, specific device applications, or parts thereof, may be temporarily loaded into a volatile memory such as RAM 2626. Received communication signals may also be stored in RAM 2626.

As shown, flash memory 2624 may be segregated into different areas for both computer programs 2658 and program data storage 2650, 2652, 2654 and 2656. These different storage types indicate that each program may allocate a portion of flash memory 2624 for their own data storage requirements. Processor 2638, in addition to its operating system functions, may enable execution of software applications on the UE 2600. A predetermined set of applications that control basic operations, including at least data and voice communication applications for example, may typically be installed on the UE 2600 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

One software application may be a personal information manager (PIM) application having the ability to organize and manage data items relating to the user of the UE 2600 such as, but not limited to, e-mail, calendar events, voice mails, appointments, and task items. One or more memory stores may be available on the UE 2600 to facilitate storage of PIM data items. Such a PIM application may have the ability to send and receive data items via the wireless network 2619. Further applications may also be loaded onto the UE 2600 through the network 2619, an auxiliary I/O subsystem 2628, serial port 2630, short-range communications subsystem 2640, or any other suitable subsystem 2642, and installed by a user in the RAM 2626 or a non-volatile store (not shown) for execution by the processor 2638. Such flexibility in application installation may increase the functionality of the UE 2600 and may provide enhanced on-device functions, communication-related functions, or both. For example, secure communication applications may enable electronic commerce functions and other such financial transactions to be performed using the UE 2600.

In a data communication mode, a received signal such as a text message or web page download may be processed by the communication subsystem 2611 and input to the processor 2638, which may further process the received signal for output to the display 2622, or alternatively to an auxiliary I/O device 2628.

A user of the UE 2600 may also compose data items, such as email messages for example, using the keyboard 2632, which may be a complete alphanumeric keyboard or telephone-type keypad, among others, in conjunction with the display 2622 and possibly an auxiliary I/O device 2628. Such composed items may then be transmitted over a communication network through the communication subsystem 2611.

For voice communications, overall operation of the UE 2600 is similar, except that received signals may typically be output to a speaker 2634 and signals for transmission may be generated by a microphone 2636. Alternative voice or audio I/O subsystems, such as a voice message recording subsystem, may also be implemented on the UE 2600. Although voice or audio signal output may be accomplished primarily through the speaker 2634, display 2622 may also be used to provide an indication of the identity of a calling party, the duration of a voice call, or other voice call-related information, for example.

Serial port 2630 may be implemented in a personal digital assistant (PDA)-type device for which synchronization with a user's desktop computer (not shown) may be desirable, but such a port is an optional device component. Such a port 2630 may enable a user to set preferences through an external device or software application and may extend the capabilities of the UE 2600 by providing for information or software downloads to the UE 2600 other than through a wireless communication network. The alternate download path may, for example, be used to load an encryption key onto the UE 2600 through a direct and thus reliable and trusted connection to thereby enable secure device communication. Serial port 2630 may further be used to connect the device to a computer to act as a modem.

Other communications subsystems 2640, such as a short-range communications subsystem, are further optional components which may provide for communication between the UE 2600 and different systems or devices, which need not necessarily be similar devices. For example, the subsystem 2640 may include an infrared device and associated circuits and components or a Bluetooth™ communication module to provide for communication with similarly enabled systems and devices. Subsystem 2640 may further include non-cellular communications such as WiFi, WiMAX, near field communication (NFC), and/or radio frequency identification (RFID). The other communications element 2640 may also be used to communicate with auxiliary devices such as tablet displays, keyboards or projectors.

Figure 27:
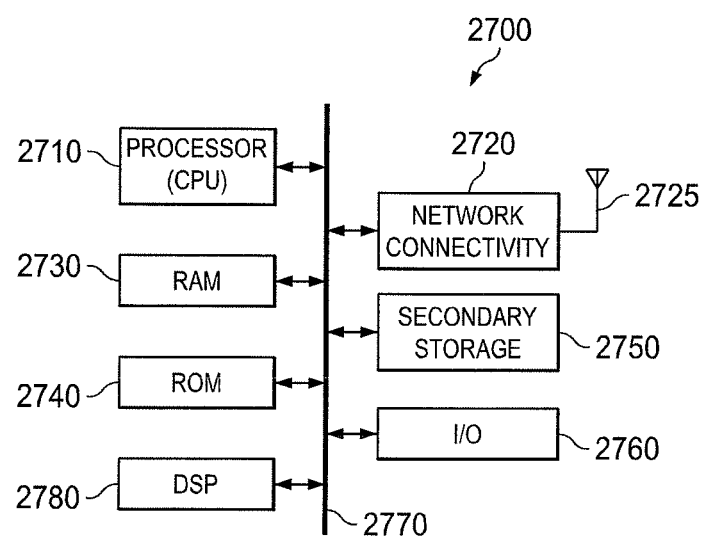
FIG. 27 illustrates a processor and related components suitable for implementing the several implementations of the present disclosure.

The UE and other components described above might include a processing component that is capable of executing instructions related to the actions described above. FIG. 27 illustrates an example of a system 2700 that includes a processing component 2710 suitable for implementing one or more implementations disclosed herein. In addition to the processor 2710 (which may be referred to as a central processor unit or CPU), the system 2700 might include network connectivity devices 2720, random access memory (RAM) 2730, read only memory (ROM) 2740, secondary storage 2750, and input/output (I/O) devices 2760. These components might communicate with one another via a bus 2770. In some cases, some of these components may not be present or may be combined in various combinations with one another or with other components not shown. These components might be located in a single physical entity or in more than one physical entity. Any actions described herein as being taken by the processor 2710 might be taken by the processor 2710 alone or by the processor 2710 in conjunction with one or more components shown or not shown in the drawing, such as a digital signal processor (DSP) 2780. Although the DSP 2780 is shown as a separate component, the DSP 2780 might be incorporated into the processor 2710.

The processor 2710 executes instructions, codes, computer programs, or scripts that it might access from the network connectivity devices 2720, RAM 2730, ROM 2740, or secondary storage 2750 (which might include various disk-based systems such as hard disk, floppy disk, or optical disk). While only one CPU 2710 is shown, multiple processors may be present. Thus, while instructions may be discussed as being executed by a processor, the instructions may be executed simultaneously, serially, or otherwise by one or multiple processors. The processor 2710 may be implemented as one or more CPU chips.

The network connectivity devices 2720 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 2720 may enable the processor 2710 to communicate with the Internet or one or more telecommunications networks or other networks from which the processor 2710 might receive information or to which the processor 2710 might output information. The network connectivity devices 2720 might also include one or more transceiver components 2725 capable of transmitting and/or receiving data wirelessly.

The RAM 2730 might be used to store volatile data and perhaps to store instructions that are executed by the processor 2710. The ROM 2740 is a non-volatile memory device that typically has a smaller memory capacity than the memory capacity of the secondary storage 2750. ROM 2740 might be used to store instructions and perhaps data that are read during execution of the instructions. Access to both RAM 2730 and ROM 2740 is typically faster than to secondary storage 2750. The secondary storage 2750 is typically comprised of one or more disk drives or tape drives and might be used for non-volatile storage of data or as an over-flow data storage device if RAM 2730 is not large enough to hold all working data. Secondary storage 2750 may be used to store programs that are loaded into RAM 2730 when such programs are selected for execution.

The I/O devices 2760 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 2725 might be considered to be a component of the I/O devices 2760 instead of or in addition to being a component of the network connectivity devices 2720.

The following are incorporated herein by reference for all purposes: 3GPP TS 25.331, 3GPP TS 36.300, 3GPP TS 36.304, 3GPP TS 36.321, 3GPP TS 36.331, RP-111372, and 3GPP TS 36.423.

The implementations described herein are examples of structures, systems or methods having elements corresponding to elements of the techniques of this application. This written description may enable those skilled in the art to make and use implementations having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method at a User Equipment (UE) comprising:
transmitting a Power Preference Indication (PPI) request to a network element;
receiving from the network element a PPI signal in response to transmitting the PPI request;
determining that a current radio resource configuration of the UE is one of a power optimized type or a normal type that is not power optimized based on the PPI signal;
responsive to the UE determining that the current radio resource configuration of the UE is the normal type, starting a prohibit timer;
prohibiting the UE from sending additional PPI requests for a radio resource configuration of the power optimized type until expiration of the prohibit timer, wherein determining that the current radio resource configuration is the normal type comprises receiving an indication as part of configuring the UE during a radio resource control (RRC) configuration procedure; and
refraining the UE from sending additional PPI requests for a radio resource configuration of the normal type for a predetermined amount of time after determining that the UE's current radio resource configuration has changed from the normal type to the power optimized type, wherein the prohibit timer runs for a longer duration than the predetermined amount of time.

2. The method of claim 1, wherein determining that the current radio resource configuration is the normal type comprises determining that the radio resource configuration is an initial radio resource configuration.

3. The method of claim 1, wherein determining that the current radio resource configuration is the normal type comprises determining a type of PPI indicated in a last PPI request transmitted from the UE to the network element, the last PPI request indicating whether the UE prefers the power optimized type of radio resource configuration.

4. The method of claim 1, wherein the indication is a Normal/Power-Optimized (N/P) flag.

5. A method at a User Equipment (UE) comprising:
transmitting a Power Preference Indication (PPI) request to a network element;
receiving from the network element a PPI signal in response to transmitting the PPI request;
determining that a current radio resource configuration of the UE is one of a power optimized type or a normal type that is not power optimized based on the PPI signal;
responsive to the UE determining that the current radio resource configuration of the UE is the power optimized type, starting a prohibit timer;
prohibiting the UE from sending additional PPI requests for a radio resource configuration of the normal type until expiration of the prohibit timer, wherein determining that the current radio resource configuration is the power optimized type comprises receiving an indication as part of configuring the UE during a radio resource control (RRC) configuration procedure;
starting a second prohibit timer in response to changing the current radio resource configuration of the UE to the normal type; and
prohibiting the UE from sending an additional PPI request for a radio resource configuration of the power optimized type until expiration of the second prohibit timer, wherein the second prohibit timer runs for a longer duration than the first prohibit timer.

6. The method of claim 5, wherein determining that the current radio resource configuration is the power optimized type comprises determining a type of PPI indicated in a last PPI request transmitted from the UE to the network element, the last PPI request indicating whether the UE prefers the power optimized type of radio resource configuration.

7. The method of claim 5, wherein the indication is a Normal/Power-Optimized (N/P) flag.

8. The method of claim 5, further comprising:
transmitting an additional PPI request for a radio resource configuration of the normal type after expiration of the prohibit timer; and
changing the current radio resource configuration of the UE to the normal type unless the UE receives a negative response from the network element within a predefined time after transmitting the additional PPI request,
wherein the UE is configured to consume less power when the UE's radio resource configuration is of the power optimized type as compared to when the UE's radio resource configuration is of the normal type.

9. A User Equipment (UE) including a processor, the UE configured to:
transmit a Power Preference Indication (PPI) request to a network element;
receive from the network element a PPI signal in response to transmitting the PPI request;
determine that a current radio resource configuration of the UE is one of a power optimized type or a normal type that is not power optimized based on the PPI signal;
responsive to the UE determining that the current radio resource configuration of the UE is the normal type, start a prohibit timer; and
refrain from sending additional PPI requests for a radio resource configuration of the power optimized type until expiration of the prohibit timer,
wherein the UE is further configured to determine that the current radio resource configuration is the normal type by receiving an indication as part of a radio resource control (RRC) configuration signal received from the network element,
wherein the UE refrains from sending additional PPI requests for a radio resource configuration of the normal type for a predetermined amount of time after determining that the UE's current radio resource configuration has changed from the normal type to the power optimized type, wherein the prohibit timer runs for a longer duration than the predetermined amount of time.

10. The UE of claim 9, further configured to determine that the current radio resource configuration is the normal type by determining that the radio resource configuration is an initial radio resource configuration.

11. The UE of claim 9, further configured to determine that the current radio resource configuration is the normal type by determining a type of PPI indicated in a last PPI request transmitted to the network element, the last PPI request indicating whether the UE prefers the power optimized type of radio resource configuration.

12. The UE of claim 9, wherein the indication includes a Normal/Power-Optimized (N/P) flag.

13. A User Equipment (UE) comprising a processor, the UE configured to:
transmit a Power Preference Indication (PPI) request to a network element;
receive from the network element a PPI signal in response to transmitting the PPI request;
determine that a current radio resource configuration of the UE is one of a power optimized type or a normal type that is not power optimized based on the PPI signal;
responsive to the UE determining that the current radio resource configuration of the UE is the power optimized type, start a prohibit timer;
prohibit the UE from sending additional PPI requests for a radio resource configuration of the normal type until expiration of the prohibit timer, wherein the UE is further configured to determine that the current radio resource configuration is the power optimized type by receiving an indication as part of a radio resource control (RRC) configuration signal received from the network element;
start a second prohibit timer in response to changing the current radio resource configuration of the UE to the normal type; and
prohibit the UE from sending an additional PPI request for a radio resource configuration of the power optimized type until expiration of the second prohibit timer, wherein the second prohibit timer runs for a longer duration than the first prohibit timer.

14. The UE of claim 13, further configured to determine that the current radio resource configuration is the power optimized type by determining a type of PPI indicated in a last PPI request transmitted to the network element, the last PPI request indicating whether the UE prefers the power optimized type of radio resource configuration.

15. The UE of claim 13, wherein the indication is indicated using a Normal/Power-Optimized (N/P) flag.

* * * * *